(12) United States Patent
Jorquera et al.

(10) Patent No.: US 10,275,679 B2
(45) Date of Patent: Apr. 30, 2019

(54) AVIAN DETECTION SYSTEMS AND METHODS

(71) Applicant: Boulder Imaging, Inc., Louisville, CO (US)

(72) Inventors: Carlos Jorquera, Louisville, CO (US);
Aaron Coppage, Louisville, CO (US);
Jason DeSalvo, Louisville, CO (US);
Ryan Luttrell, Louisville, CO (US);
Jason Luttrell, Louisville, CO (US)

(73) Assignee: IDENTIFLIGHT INTERNATIONAL, LLC, Louisville, CO (US)

( * ) Notice: Subject to any disclaimer, the term of this patent is extended or adjusted under 35 U.S.C. 154(b) by 755 days.

(21) Appl. No.: 14/832,370

(22) Filed: Aug. 21, 2015

(65) Prior Publication Data

US 2016/0055400 A1 Feb. 25, 2016

Related U.S. Application Data

(60) Provisional application No. 62/040,018, filed on Aug. 21, 2014.

(51) Int. Cl.
*G06K 9/62* (2006.01)
*F03D 80/10* (2016.01)
(Continued)

(52) U.S. Cl.
CPC ............. *G06K 9/62* (2013.01); *F03D 7/02* (2013.01); *F03D 7/0264* (2013.01); *F03D 17/00* (2016.05);
(Continued)

(58) Field of Classification Search
CPC ....................................................... H04N 7/18
See application file for complete search history.

(56) References Cited

U.S. PATENT DOCUMENTS 6,250,255 B1 6/2001 Lenhardt et al.
6,411,327 B1 6/2002 Kweon et al.
(Continued)

FOREIGN PATENT DOCUMENTS

DE   10 2008 018880 A1   12/2010
DE   10 2012 215451 A1   2/2013
(Continued)

OTHER PUBLICATIONS

Arnett et al. (2007) "Impacts of Wind Energy Facilities on Wildlife and Wildlife Habitat," Technical Review 07-2. The Wildlife Society. Accessible on the Internet at URL: http://wildlife.org/wp-content/uploads/2014/05/Wind07-2.pdf. [Last Accessed Mar. 17, 2016].
(Continued)

*Primary Examiner* — Anand S Rao
(74) *Attorney, Agent, or Firm* — Leydig, Voit & Mayer, Ltd.

(57) ABSTRACT

Provided herein are detection systems and related methods for detecting moving objects in an airspace surrounding the detection system. In an aspect, the moving object is a flying animal and the detection system comprises a first imager and a second imager that determines position of the moving object and for moving objects within a user selected distance from the system the system determines whether the moving object is a flying animal, such as a bird or bat. The systems and methods are compatible with wind turbines to identify avian(s) of interest in airspace around wind turbines and, if necessary, take action to minimize avian strike by a wind turbine blade.

94 Claims, 23 Drawing Sheets

(51) Int. Cl.

| | | |
|---|---|---|
| *F03D 7/02* | (2006.01) | |
| *G06T 7/20* | (2017.01) | |
| *H04N 5/225* | (2006.01) | |
| *H04N 5/232* | (2006.01) | |
| *H04N 5/247* | (2006.01) | |
| *G06K 9/00* | (2006.01) | |
| *G06K 9/20* | (2006.01) | |
| *F03D 80/00* | (2016.01) | |
| *F03D 17/00* | (2016.01) | |
| *G06T 7/73* | (2017.01) | |
| *G06T 7/13* | (2017.01) | |
| *G06T 7/90* | (2017.01) | |
| *H04N 13/239* | (2018.01) | |

(52) U.S. Cl.
CPC ............ *F03D 80/00* (2016.05); *F03D 80/10* (2016.05); *G06K 9/00335* (2013.01); *G06K 9/00624* (2013.01); *G06K 9/209* (2013.01); *G06K 9/6267* (2013.01); *G06T 7/13* (2017.01); *G06T 7/20* (2013.01); *G06T 7/74* (2017.01); *G06T 7/90* (2017.01); *H04N 5/2252* (2013.01); *H04N 5/23238* (2013.01); *H04N 5/23296* (2013.01); *H04N 5/247* (2013.01); *H04N 13/239* (2018.05); *F05B 2270/8041* (2013.01); *G06T 2207/30241* (2013.01); *Y02E 10/721* (2013.01); *Y02E 10/723* (2013.01)

(56) References Cited

U.S. PATENT DOCUMENTS

| | | | |
|---|---|---|---|
| 6,623,243 | B1 | 9/2003 | Hodos |
| 7,701,362 | B2 | 4/2010 | Philiben |
| 8,123,476 | B2 | 2/2012 | Stommel |
| 8,284,258 | B1 | 10/2012 | Cetin et al. |
| 8,379,486 | B2 | 2/2013 | Adler et al. |
| 8,401,225 | B2 | 3/2013 | Newcombe et al. |
| 8,598,998 | B2 | 12/2013 | Vassilev et al. |
| 8,780,198 | B2 | 7/2014 | McClure et al. |
| 8,810,411 | B2 | 8/2014 | Marka et al. |
| 9,046,080 | B2 | 6/2015 | Sliwa |
| 9,125,394 | B2 | 9/2015 | Kinzie et al. |
| 2005/0162978 | A1 | 7/2005 | Lima |
| 2008/0260531 | A1 | 10/2008 | Stommel |
| 2008/0298692 | A1 | 12/2008 | Guo et al. |
| 2008/0298962 | A1 | 12/2008 | Sliwa |
| 2009/0185900 | A1 | 7/2009 | Hirakata et al. |
| 2010/0245539 | A1 | 9/2010 | Lin |
| 2011/0043630 | A1 | 2/2011 | McClure et al. |
| 2011/0109491 | A1 | 5/2011 | Laufer |
| 2011/0192212 | A1 | 8/2011 | Delprat et al. |
| 2011/0260907 | A1 | 10/2011 | Roche |
| 2012/0003089 | A1 | 1/2012 | Byreddy et al. |
| 2013/0050400 | A1 | 2/2013 | Stiesdal et al. |
| 2013/0052010 | A1 | 2/2013 | Nielsen et al. |
| 2013/0098309 | A1 | 4/2013 | Nohara et al. |
| 2013/0155235 | A1 | 6/2013 | Clough et al. |
| 2013/0224018 | A1 | 8/2013 | Kinzie et al. |
| 2013/0249218 | A1 | 9/2013 | Vassilev et al. |
| 2013/0257641 | A1 | 10/2013 | Ronning |
| 2013/0280033 | A1 | 10/2013 | Babbitt et al. |
| 2014/0148978 | A1 | 5/2014 | Duncan et al. |
| 2014/0241878 | A1 | 8/2014 | Herrig et al. |
| 2014/0261151 | A1 | 9/2014 | Ronning |
| 2014/0313345 | A1 | 10/2014 | Conard et al. |
| 2015/0230450 | A1 | 8/2015 | Norris |
| 2016/0053744 | A1 | 2/2016 | Wenger et al. |

FOREIGN PATENT DOCUMENTS

| | | |
|---|---|---|
| EP | 1 937 966 B1 | 11/2011 |
| JP | 2003-021046 A | 1/2003 |
| WO | WO 2009/102001 A1 | 8/2009 |
| WO | WO 2010/067057 A2 | 6/2010 |
| WO | WO 2015/187172 A1 | 12/2015 |

OTHER PUBLICATIONS

DTBird Product Brochure (2013) "A Self-Working System to Reduce Bird and Bat Mortality at Wind Farms," DTBird.

DeTect (2014) "Bird & Bat Radar Systems," DeTect, Inc. Accessible on the Internet at URL: http://www.detect-inc.com/avian.html. [Last Accessed Mar. 17, 2016].

DTBird (Jan. 2013) "DTBird versus Radar Technology in operating Wind Farms," DTBird.

International Search Report with Written Opinion corresponding to International Patent Application No. PCT/US2015/046327, dated Nov. 9, 2015.

Mahammed et al. (Mar. 2013) "Object Distance Measurement by Stereo Vision," International Journal of Science and Applied Information Technology. 2(2):5-8.

May et al. (Dec. 2012) "Evaluation of the DTBird video-system at the Smola wind-power plant. Detection Capabilities for Capturing Near-Turbine Avian Behavior," Report No. 910. Norwegian Institute for Nature Research.

Wen et al. (Apr. 1, 2014) "Automatic Bird Species Detection From Crowd Sourced Videos," IEEE Transactions on Automation Science and Engineering. 11(2):348-358.

AVIAN DETECTION SYSTEMS AND METHODS

CROSS-REFERENCE TO RELATED APPLICATIONS

This application claims the benefit of U.S. Pat. App. No. 62/040,018, filed Aug. 21, 2014, which is specifically incorporated by reference in its entirety.

BACKGROUND OF INVENTION

There is an interest and need in the art for reliable and robust detection of flying avians. Avian detection systems have many applications, ranging from avian counts, classification and/or identification in a specific geographical location, to deterrence and counter-measure systems for aviation and wind production systems. A common objective of such systems is the replacement of subjective and inaccurate human-based counts with an automated and reliable detection system. This is a reflection that human-based detection of flying avians requires intensive training to be able to properly identify avians and species thereof, is highly labor intensive and is inherently inaccurate.

One specific application of bird detection systems is for wind energy generation. There is concern as to the risk to avians arising from avian-wind turbine collision. One challenge for accurately assessing the risk of wind turbine collision by a flying avian is the difficulty in reliably determining the number of birds and the species of such birds in an area of a turbine or a to-be-located turbine. It is difficult to continuously monitor airspace, and so conventional bird strike fatality searches are conducted using systematic schedules with an attendant estimate of fatalities based on a uniform distribution over time, as explained in "Impacts of Wind Energy Facilities on Wildlife and Wildlife Habitat" Technical Review 07-2. September 2007 (available at: wildlife.org/documents/technical-reviews/docs/Wind07-2.pdf). This has numerous disadvantages, including not accounting for cluster fatalities, injured avians that leave the immediate area or are removed by scavengers, and the challenge associated with reliably and consistently locating carcasses. Regardless of such inaccuracies, there has been documentation of raptor fatalities at wind turbine fatalities. See, e.g., Id. at p. 15 and references cited therein, including for California-based wind-farm facilities such as the Altamont Pass Wind Resource Areas (APWRA), San Goronio and Tehachapi. Estimates for raptor kills at APWRA per year range from between 881-1300 or about 1.5-2.2 raptor fatalities/MW/year, including about 75 to 116 Golden Eagles. With these statistics in mind, there is interest in bird detection systems including for use with wind-farm planning, development, expansion and operation.

One example of a bird detection and dissuasion system is dtbird® by Liquen (description available at dtbird.com/index.php/en/technology/detection). A fundamental limitation of that system is the reported detection efficiency of 86-96% for a distance of only 150 m from the wind turbine, with an efficiency that falls off with increasing distances.

Other implementations of avian detection systems are based on radar including, for example, Merlin Avian Radar Systems by DeTect (www.detect-inc.com/avian.html). Those systems, however, require bulky and expensive radar equipment and are not suited to distinguishing between avian species of interest. For example, a fundamental drawback is the inability to distinguish between an endangered or valued raptor species and another bird species that is neither endangered or of commercial importance. For example, it would be beneficial to distinguish between a golden eagle and a turkey vulture, for example with action implementation for wind blade speed tailored to species of interest only. Radar systems are not suited for such applications, as they do not obtain visual details that would otherwise distinguish between different bird species that are similarly sized and/or have similar flight characteristics. Furthermore, radar-based systems produce many false-positives, including arising from moving objects such as a turbine blade.

U.S. Pat. Pub. 2013/0050400 (Stiesdal) describes an arrangement to prevent collision of a flying animal with a wind turbine. Stiesdal, however, is limited in that there is not full spatial coverage, but instead focuses on imaging horizontal directions. U.S. Pat. No. 8,598,998 describes an animal collision avoidance system. Other systems are described, for example, in U.S. Pat. Pub. Nos. 2009/0185900 (Hirakata) and 2008/0298692 (Silwa). Each of those systems have inherent limitations, such as not providing full coverage of all directions of the surrounding airspace, do not provide sufficient detection efficiency and/or cannot reliably distinguish between avian species and confine detection to a specific avian species.

Because of the risk to migratory birds, raptors and other avians of interest including bats, it is desirable to have a reliable, cost-effective and robust system for identifying certain avian species, including before siting of wind turbine(s) as well as during wind turbine operation. Provided herein are various methods and systems for avian detection, including highly reliable and sensitive detection systems over sufficiently large detection ranges that provide sufficient time to take action to minimize or avoid unwanted contact between a specific avian species and the wind turbine, while minimizing unnecessary wind turbine shutdown for avian species or other moving objects that are not of interest, while avoiding the need for large groups of human observers.

SUMMARY OF THE INVENTION

The disclosed systems and methods provide detection of a flying avian for large airspace volumes in a manner that is both cost-effective and reliable. The systems are completely scalable, being compatible with any number of imagers and systems, dependent on the application of interest, with larger areas covered by increasing the number of systems. Integration of specially configured imagers with efficient algorithms facilitate rapid and accurate determination of moving objects along with whether such moving objects may represent an avian of interest warranting further analysis for moving objects within a user-defined airspace. A first wide field of view imager assists with simultaneously monitoring a very large airspace and images any number of potential moving objects. Various algorithms, including pattern recognition, edge detection and boundary parameter analysis, and behavior analysis of avian body position and posture or perspective relative to the environment, further refines the decision as to whether a detected moving object should be further analyzed. A second high zoom imager, such as a stereo imager, optically zooms on relevant detected moving objects and can provide rapid information as to the distance of the moving object and additional information related to finer optical characteristics of the moving object to facilitate species identification of a flying avian.

One advantage of the systems provided herein is the ability to image surrounding airspace in all available viewing directions from a source or origin centered on or around the systems. This ability to image all-views from a system to the surrounding airspace is generally referred herein as providing substantially complete hemispherical coverage of the surrounding airspace. The configuration of the imagers and integration with a processor that analyzes images facilitates reliable detection at a large distance for any viewing direction, such as greater than 600 m and up to at least about 1.2 km, and any ranges therein. The ability to reliably detect a flying avian at such large distances is particularly useful for wind turbine systems where a fast diving or flying raptor requires a sufficiently advanced detection and warning to permit action implementation ahead of impact. For example, reliable detection at a range of between about 800 m to 1 km is beneficial for providing sufficient stop time for a moving wind turbine blade before a speeding avian would otherwise potentially contact a moving wind turbine blade. Furthermore, the large airspace coverage reduces the total number of systems required, with one system providing reliable airspace coverage that may otherwise require a plurality of conventional systems. This is a reflection of the capacity of the instant systems for collection, storage, and/or analysis of large volumes of data, including simultaneously.

The avian detection system may be for detecting a flying avian in an airspace. The system comprises a first imager having a wide field of view for detecting a moving object; a second imager having a high zoom; a positioner operably connected to the second imager for positioning the second imager to image the moving object detected by the first imager; and a processor operably connected to receive image data from the first imager, the second imager, or both to identify a moving object that is a flying avian based on image data. An advantage of the instant detection systems is the capability of substantially complete hemispherical coverage of airspace surrounding the avian detection system up to large distances from the system.

Any of the systems described herein may comprise a plurality of first imagers and second imagers arranged in a spatial configuration to provide substantially complete hemispherical coverage.

The first imager may comprise a fish-eye lens or detector configured to image visual data from a substantially hemispherical surrounding airspace, and may include a plurality of individual images to provide the desired field-of-view.

The substantially complete hemispherical coverage may provide coverage for a volume of airspace having a detection distance from the first imager that is greater than or equal to 0.6 km and less than or equal to 2 km or between 0.6 km and 1.2 km. With this in mind, any of the airspaces provided herein may have a volume associated therewith from which a corresponding half-hemisphere radius is determined (e.g., $V_{airspace}=(2/3)\pi r^3$, where r is selected so as to provide the airspace volume equivalent to that being monitored by the system). Accordingly, r provides a type of average detection distance that is effectively imaged by any of the systems provided herein. Variation in r over the airspace volume outer surface may be statistically quantified, such as by a standard deviation, standard error of the mean, or the like. In an aspect, the standard deviation is less than or equal to about 20%, 10% or 5% of an average value of r. For stand-alone systems that do not directly observe airspace immediately above the system, a second system positioned at a separation distance may provide the desired coverage of that airspace, so that in combination substantially or complete hemispherical coverage around the system is achieved.

The systems and methods provided herein may be described in terms of detection efficiency for a selected avian species of interest that is greater than 96% for the volume of airspace, including better than 99% or 99.9% so that there is a statistically insignificant chance of missing an avian species of interest. The systems and methods provided herein may be described as having a percentage of false positives for a flying avian species of interest that is less than or equal to 5% for the volume of airspace. The detection efficiency, along with low level of false positive identification, is a fundamental improvement over the art, particularly considering the large volumes of airspace that are monitored, such as between about 0.45 km$^3$ and 16.8 km$^3$ or 0.45 km$^3$ and 2.1 km$^3$ (corresponding to detection distances between about 0.6 km and 2 km, or 0.6 km and 1 km, respectively), or any subrange thereof.

The avian species of interest may be a golden eagle or an endangered flying avian species.

The processor may identify an output of a subset of pixels of the first imager or the second imager corresponding to the moving object. The subset of pixels may comprise neighboring pixels, directly adjacent pixels, or both. The output of the subset of pixels may be an array of intensity values, with each value corresponding to an individual pixel intensity and/or a color value, with various colors assigned a numerical value to assist with color identification. The output of the subset of pixels may be a time varying output. In this manner, regions are identified corresponding to a moving object.

The processor may analyze the output of the subset of pixels to determine if the moving object is a flying avian. The output may further be a single frame or may be from more than one frame, a time course of a single frame or from more than one frame, or a combination thereof, to facilitate a time-varying output.

The processor may analyze the output to identify the presence of one or more threshold identification attributes, such as a threshold identification parameter that is a boundary parameter. The boundary parameter may correspond to an edge boundary signature characteristic of a flying avian. In this manner, the threshold identification parameter may provide an initial cut-off for determining whether to further analyze or characterize the subset of pixels.

In an aspect, the edge boundary signature may be identified by determining an intensity gradient of the output of the subset of pixels. The edge boundary signature may be identified by comparing the intensity gradient to one or more reference values. In this aspect, "reference values" may be used to distinguish objects that correspond to non-animal objects, such as clouds, debris, plants, or artificial objects. For example, the edge boundary signature may correspond to an edge straightness parameter, and the output identified as corresponding to an artificial object for an edge straightness parameter indicative of an artificially constructed straight line. Straight lines or unduly smooth curves tend to be artificial in nature and may be used to assist with preliminary characterization of a moving object as not a flying avian. Accordingly, the edge boundary signature may relate to quantification of a parameter related thereto, such as a length, curvature, smoothness, roughness, color, light gradient, light intensity, light wavelength, uniformity, or the like.

In an aspect, the edge boundary signature corresponds to a flying avian, such as a threatened or endangered avian species of interest.

Any of the one or more threshold identification attributes may be a time evolution parameter, such as a time evolution parameter corresponding to a time evolution signature characteristic of movement of a flying avian.

In an aspect, the one or more threshold identification attributes may be a color parameter. In an aspect, the color parameter may correspond to a color signature characteristic of a flying avian.

Upon identification of the presence of one or more threshold identification attributes, the processor may analyze the output of the subset of pixels to determine one or more avian identification parameters.

The processor may compare the output of the subset of pixels to one or more reference values in a reference image database to determine if the moving object is a flying avian, including assigning a probability that the moving object is a flying avian and/or a flying avian species of interest. In this manner, resources may be appropriately prioritized to the higher probability objects.

The processor may compare output of the subset of pixels to reference values to determine one or more avian identification parameters selected from the group consisting of size, speed, wing span, wing shape, avian posture or ratio of wing span width to height or vice versa (w/h or h/w), color, boundary shape, geometry, light intensity, and flight trajectory. In this context, "reference values" may refer to values that are empirically obtained from known flying avians. For example, a flying avian may be observed and the size, speed, wing span, wing shape, color, boundary shape, geometry, intensity, posture and typical trajectories obtained and defined by ranges about an average. These parameters may be obtained for a specific avian or a plurality of avians. The reference values may be provided in a reference image database or determined using one or more reference image algorithms, with the database or algorithm operably connected to the processor. The reference image algorithm may be part of a machine learning application so that the system is characterized as a smart system that continuously learns and updates to further improve avian characterization as more reference images are obtained and characterized.

In an aspect, the processor analyzes output of the subset of pixels via a pattern recognition algorithm. The pattern recognition algorithm may identify the subset of pixels as a species of flying avian, including a threatened or endangered raptor species.

Any of the systems and methods provided herein may have a processor that analyzes output of the subset of pixels from a plurality of frames containing the image data, wherein the subset of pixels spatially moves with time (for a fixed-stationary imager) and the movement with time is used to determine a trajectory of the output of the subset of pixels. In this manner, the trajectory may comprise positions, distances, velocities, directions or any combination thereof over time. Accordingly, the systems and methods may further comprise determining a predictive trajectory corresponding to a future time interval. For those situations where an object is flying directly toward an imager, the movement may effectively be determined by an increase in number of pixels in the output of the subset of pixels with time, as the object moves toward the imager. Similarly, for an object moving directly away, the number of pixels in the output of the subset of pixels with time may decrease. A moving object that is not substantially changing in distance from the imager, may correspond to a subset of pixels that does not significantly change in number with time, but will, in contrast to direct flight to and away from an imager, have a change in pixel location relative to a non-moving camera.

Any of the pattern recognition algorithms may comprise a database of physical parameters associated with a flying avian species of interest, and the processor compares a physical parameter determined from the first imager or the second imager to a corresponding physical parameter from the database of physical parameters to filter out moving objects that are not a flying avian or are not a flying avian species of interest and/or assign probabilities thereto. Such parameters are also referred herein as an "avian identification parameter". The avian identification parameter is any observable parameter useful for classifying a moving object as an avian, including a specific avian species. Examples include physical parameters of the avian, such as size, color, shape, or other physically distinctive characteristics. Other parameters include flight trajectory or wing motion (or lack thereof).

Any of the avian detection systems and methods may be used to detect a flying avian of interest that is a government, agency, federally or state-protected raptor, such as an endangered raptor species or a golden eagle.

Any of the avian detection systems utilize a processor that filters moving objects that do not correspond to an avian species of interest. For example, the avian may correspond to a plentiful species that is not endangered such as a turkey vulture, for example. Alternatively, the moving object may in fact not even be an avian, but instead debris blowing through the airspace, an aircraft, cloud movement, or other natural motion of vegetation. The systems provided herein accommodate such moving objects and, for such objects, no action implementation is taken. This is in contrast to radar-based systems that cannot effectively ascertain such false positives.

In an aspect, the systems and methods are described further in terms of an optical parameter of the imagers. For example, the first imager wide field of view may be quantified and selected from a range that is greater than or equal to 0.5 $km^2$ and less than or equal to 1.6 $km^2$ at a defined detection distance, such as about 0.8 km to about 1.2 km. Alternatively, the first imager may be described as having a certain range of the field of view. For a first imager having a rectangular lens, the fields of view may be described in a horizontal and a vertical direction, such as independently selected between about 60° and 180°, or between about 60° and 120°. A first imager system (e.g. a wide field of view or WFOV system) may be formed from a plurality of first imagers, such as a pair of imagers aligned relative to each other at a 60° to 70° angle that, in combination, provide an at least 120° reliable coverage. A combination of those first imager systems then can provide complete circumferential coverage and, up to a point, hemispherical coverage. In an aspect, any of the imagers provided herein may be described as having a resolution. As used herein, resolution refers to the ability to reliably resolve elements of a defined size. For example, the first imager may have a resolution that is suitable to detect a moving object that is a bird. In an aspect, the resolution of the first imager capable of detecting a moving object that may be a bird is between about 8"/pixel to about 14"/pixel. Similarly, the resolution of the first imager may be about 0.3 m. Alternatively, the resolution of the first imager may be described in functional terms as being of sufficient resolution to detect a bird of interest having a defined size, such as the size of an avian of interest, including a golden eagle.

The second imager may be described, for example, as having a high zoom that may be selected from a range that is greater than or equal to 10× and less than or equal to 1000×, or that may be fixed but at a high zoom, and may be also be described as part of a stereo imager to provide distance information. Similar to the resolution described for the first imager, the second imager may be described in terms of a resolution. In particular, the second imager is configured to be able to provide a high zoom on a region identified, at least in part, by the first imager as a moving bird. The resolution is selected so as to provide information in confirming the moving object is a bird and also for species identification. In an aspect, the resolution of the second imager is greater than or equal to 0.25 cm/pixel and less than or equal to 10 cm/pixel, including greater than or equal to 0.25 cm/pixel and less than or equal to 1 cm per pixel. At this high resolution, precise identifying feature information may be obtained for the moving object, down to eye color, beak color, ruffling shape, tail feather shape, wing tip shape, and other visually distinctive shapes for the avian species of interest. The "high zoom" may simply refer to the higher resolution compared to the first imager, with a fixed high zoom used in combination with a positioner such as a pan and tilt, to ensure the second imager images a desired region identified by the first imager.

To provide field of view to detect an avian positioned anywhere within the airspace surrounding the imaging system, a plurality of first imagers may be arranged in distinct alignment directions to provide full 360° and hemispherical coverage by the plurality of first imagers fields of view up to and including a vertical alignment direction. In this aspect, one of the first imagers is arranged in a vertical alignment direction to provide coverage for airspace in a vertical direction that is not otherwise covered by another first imager field of view. This is particularly relevant for airspace that is around a physical object extending a vertical height, such as a building, a vehicle, or a wind-mill. A plurality of such oriented first imagers ensures coverage of all approaches to the building, airstrip/airfield or wind-turbine. Alternatively, a plurality of systems may be used to ensure desired hemispherical coverage.

A moving object may be continuously identified for object movement from a first imager field of view to a spatially adjacent second first imager field of view, including for another first imager that is itself part of the system or part of a distinct second system.

As desired, the imagers may image a field of view in the visible spectrum and/or the non-visible spectrum. For example, imaging of an infra-red emission from the field of view is useful for detection of living animals of a different temperature than the surrounding airspace. Accordingly, the first imager, the second imager, or both the first and the second imagers may be configured to detect a wavelength range corresponding to light in the visible or infra-red spectrum. Such a wavelength range is in the infra-red is useful for identification in low-light (e.g., night) or adverse weather conditions, or any conditions where color/visibility is not distinguishable.

Any of the avian detection systems may be configured to simultaneously identify a plurality of moving objects and, as desired, determine threshold identification attribute(s) and avian identification parameters, and probabilities associated therewith.

One application of any of the avian detection systems and methods described herein is with a wind turbine and that is used to decrease incidence of avian kills by a wind turbine, including for a specific avian species of interest that may include a raptor, or a golden eagle.

A plurality of avian detection systems may be connected to a wind turbine in distinct alignment directions to provide said substantially complete hemispherical coverage of said airspace surrounding the wind turbine. For example, one of the first imagers may be oriented in an upward direction to cover a region of airspace above the wind turbine, whereas other imagers provide airspace coverage closer to the ground in a full 360° coverage orientation. Alternatively, the systems may be stand-alone and spatially separated from the wind turbines, such as strategically positioned around and within an area to-be-monitored, including around a perimeter footprint of a wind-turbine or a windfarm comprising a plurality of spatially-separated wind-turbines. In this manner, a significant reduction in the total number of systems may be realized as there may be substantially less than a one system to one wind-turbine ratio needed to achieve adequate and reliable coverage.

Any of the systems and methods provided herein may further comprise a controller operably connected to the processor to provide an action implementation. Examples of action implementation include those selected from the group consisting of an alarm, an alert to an operator, a count, an active avoidance measure, or a decrease or stop to a wind turbine blade speed when the avian detection system identifies a flying avian that is a threatened or an endangered species having a predicted trajectory in a wind turbine surrounding airspace that will otherwise likely result in wind turbine blade impact. As desired, for windfarm applications, this slowing or stopping of blade speed can be for subset of wind-turbines in the windfarm identified as being at high risk of an endangered avian turbine strike.

Another application of the avian detection systems and methods provided herein include for counting a number of flying avians and/or species of interest identification within the airspace surrounding an avian detection system over a time period. This can assist with environmental impact statements, risk assessment and management.

The avian detection systems and methods herein are compatible with stationary applications or moving applications. For example, stationary applications include simple bird count surveys at a fixed location. Moving applications include those where even larger regions are to be examined, in which case the systems can be mounted to a moving vehicle, including a land-based, sea-based, or airborne vehicle.

The systems are compatible with any kind of positioners. For example, the positioner can comprise a motorized pan and tilt head connected to the second imager for moving an alignment direction of the second imager based on an output from the first imager The first imager, the second imager, or both the first and second imagers may be cameras, having lenses and sensors. Exemplary cameras include cameras having CCD or CMOS sensors.

Any of the systems provided herein may be used with a second imager that is a stereo imager to determine distance and optionally trajectory of moving objects. The avian detection system for detecting a flying avian in an airspace may comprise a first imager having a wide field of view for detecting a moving object; a stereo imager comprising a pair of imagers each independently having a high zoom; a positioner operably connected to the stereo imager for positioning said stereo imager to image said moving object detected by the first imager; and a processor operably connected to receive image data from said first imager, said stereo imager, or both and to determine a position and trajectory of said moving object, thereby identifying a moving object that is a flying avian based on image data from the first imager, the second imager, or both the first and second imager.

The avian detection system may provide substantially complete hemispherical coverage of airspace surrounding the avian detection system. For example, the avian detection system may comprise a plurality of first imagers and a plurality of stereo imagers, wherein one or more of the imagers are aligned in distinct alignment directions to provide the substantially complete hemispherical coverage of airspace surrounding the avian detection system. For example, the first imagers may be fixably positioned and the second imagers positionable with a controlled alignment direction, including with a pan and tilt, to provide coverage over a large field of view without sacrificing resolution.

Any of the avian detection systems may have a processor that is wirelessly connected to the imagers or a processor that is hard wired to obtain image data output from the first imager, the second imager, or the stereo imager.

Also provided herein are methods of detecting a flying avian species implemented by any of the systems disclosed herein.

Also provided herein are methods of detecting a flying avian in an airspace. The method may comprise the steps of: imaging the airspace surrounding an imaging system; obtaining one or more threshold identification attributes for an output of a subset of pixels from the imaging step; analyzing the one or more threshold identification attributes to identify a moving object of interest; obtaining one or more avian identification parameters for the moving object of interest; comparing the one or more avian identification parameters to a corresponding one or more reference avian identification parameters to identify a flying avian; and implementing an action implementation for the flying avian; wherein the method detects the flying avian within the airspace having a volume equivalent to an average-equivalent hemispherical airspace with an average radius selected from a range that is greater than or equal to 0.5 km and less than or equal to 1.2 km, or any subranges thereof.

In an aspect, the imaging step comprises identifying an output of a subset of pixels, such as an output that is an array of light intensity values.

The imaging step may comprise obtaining a wide field of view with a first imager and optically zooming and/or focusing in on the moving object of interest with a second imager, wherein the second imager is used to determine a position of the moving object of interest from the imaging system. The position may also be determined relative to another point fixed relative to the imaging system. For example, a ground based imager that is at a distance from a wind turbine may be used to determine an avian position relative to the wind turbine, thereby providing a distance from the wind turbine. Similarly, positions and distances from other objects may be determined, including an airplane, a runway, a building, a power-line, or any other structure.

The method may further comprise classifying a species for the flying avian of interest. For example, the output of the subset of pixels corresponding to a flying avian may be further analyzed with the avian identification parameter to determine whether the flying avian corresponds to a particular species. The particular species is also referred herein generally as a "species of interest" and may correspond to a raptor or other avian of interest, depending on the application of interest.

The imaging step may further comprise obtaining a plurality of images at different times and determining a trajectory of the output of the subset of pixels.

Any of the systems and devices provided herein may determine the distance of the moving object using a second imager that is a stereo imager that is positioned to image the moving object. In this manner, objects that may be large but positioned far away are positionally distinguished from smaller objects that are located closer to the system.

Any of the classifying steps and/or identifying steps may comprise a pattern recognition algorithm.

As used herein, the one or more threshold identification attributes may be selected from the group consisting of distance, trajectory, boundary parameter, boundary shape, edge boundary characteristic, pixel spacing, pixel intensity, pixel color, intensity gradient, time evolution parameter, and any combination thereof.

The one or more threshold identification attributes may be a boundary parameter. Accordingly, any of the methods provided herein may further comprise the step of comparing the boundary parameter to an edge boundary signature characteristic of a flying avian. Examples of edge boundary signatures characteristic of a flying avian may include shapes, colors, intensity, and relative distributions thereof. For example, for an avian that is a bird, specific shapes of wingtips, body, head, tail feathers may provide edge boundary signature characteristics useful to compare against the boundary parameter obtained from the output of the subset of pixels.

Similarly, a boundary parameter may be used to determine if the moving object that is related to the output of the subset of pixels corresponds to an artificially-constructed object, such as an airplane. This may be accomplished by identifying a moving object as corresponding to an artificially-constructed object by identifying at least a portion of the boundary parameter as having a shape indicative of an artificially-constructed object, including an edge straightness parameter indicative of the artificially constructed object. The edge straightness parameter may quantify how straight a portion of the boundary is or, similarly, the smoothness of a portion of the boundary. Avians that are birds or bats typically do not have continuously highly straight or smooth boundary edges.

The one or more avian identification parameter may be selected from the group consisting of size, speed, wing span, wing shape, color, boundary shape, geometry, light intensity, flight trajectory, posture, temperature or a heat signature.

Any of the methods may further comprise the step of obtaining a predictive trajectory of the flying avian, such as based on prior determined trajectories. For example, an avian that is soaring in upward circles may be predicted herein to have a similar continuing trajectory. Alternatively, an avian that is in a dive may be predicted to continue the dive to a certain elevation followed by an abrupt pull out of the dive.

The to be detected flying avian may be a threatened species, an endangered species, or a migratory bird. For example, the threatened or endangered species is a raptor. In this manner, the systems and methods provided herein are readily adapted for the windfarm location, as different geographic locations have political and ecological conditions that, in turn, affect which avians are of interest. The systems and methods may be adapted by accordingly revising and updating the relevant reference values in a pattern recognition algorithm and avian identification parameter. For example, a migratory sea bird may have a different appearance, size and flight characteristics than a golden eagle. A system in a sea-bird detection application, therefore, may be accordingly tailored for detection of the sea bird, whereas a golden eagle detection application tailored for the golden eagle.

Any of the methods provided herein may utilize a comparing step that comprises a pattern recognition algorithm to facilitate processing and identification.

The methods and systems provided herein represent a substantial improvement of the art, characterized as having extremely high reliability rates of detection even over large distances. In an aspect, the system may be described in terms of a detection sensitivity that is greater than 96% and a false positive detection that is less than 5% for a threatened species, endangered species, or a species of interest for the airspace up to a maximum distance from the imaging system that is greater than 0.6 km and less than 1.2 km. The effect of such rates is that few, if any, species of interest are missed and there is little, if any, over-detection by incorrectly assigning a species identification to the incorrect avian. The systems provided herein, therefore, have a number of important applications, including for a wind turbine.

Any of the systems and methods may be used with a wind turbine. The method may further comprise the steps of decreasing a blade wind turbine speed or stopping movement of the blade turbine to minimize or avoid risk of blade strike by the flying avian having the predictive trajectory that would otherwise likely result in blade strike of the avian or that may be within an actionable interior airspace that is within the surrounding airspace.

In an aspect, the avian is a species that is a threatened or endangered species, including those that are defined under the Endangered Species Act of U.S. law for U.S.-based applications, or any species identified by foreign government agencies, or international treaty. In an aspect, the avian is a golden eagle.

An advantage of the methods and devices herein in a wind-energy application is that characterization of avian species assists with maximizing wind turbine output by avoiding decreasing or stopping wind turbine blade speed for an avian identified as not corresponding to the species of interest. In an aspect, the blade wind turbine speed is not actively decreased for an avian species that is identified as not an avian species of interest, thereby maximizing wind turbine efficiency.

The implementing an action step may comprise one or more of: providing an alert to a person; emitting an alarm; triggering a count event; triggering a deterrent to encourage movement of the flying avian out of the surrounding the first imager; recording an image or video of the avian flying through the airspace surrounding the first imager; or decreasing or stopping a wind turbine blade speed.

The method may further comprise the step of defining an action implementation airspace having an average action distance that is less than the average-equivalent radius of the substantially hemispherical airspace surrounding the imaging system, wherein the action implementation is implemented for a flying avian that is either within the substantially hemispherical airspace and having a trajectory toward the action implementation airspace; or within the action implementation airspace. This aspect may be particularly useful in wind blade strike avoidance where the flying avian is tracked in the airspace but no affirmative countermeasure to avoid or minimize blade strike is undertaken until the flying avian is within a "danger" zone or appears headed to the danger zone. This danger zone may be referred herein as an action implementation airspace that is less than the surrounding airspace, such as being similarly hemispherical but with a radius that may be less than 70%, less than 50% or less than 30% of the maximum detection distance, such as for a maximum detection distance of between about 600 m and 1.2 km. The higher the velocity of the bird, the larger the danger zone range, so that appropriate countermeasures can be taken before a potential bird-strike. Accordingly, any of the systems and methods may have a detection distance that is determined to ensure sufficient time for a countermeasure is available for a maximum determined flight speed of the avian of interest. Alternatively, the detection distance may be actively controlled and varied depending on conditions. For example, wind speed and direction may be detected, with the detection distance accordingly varied to increase in distance from directions where the avian would be wind-assisted and decrease the distance where the avian would be flying into the wind.

Any of the methods may further comprise the step of turbine masking for an image of a flying avian in an optical region containing a moving turbine blade, thereby improving detection, including by the algorithm of FIG. 5.

Also provided herein is an avian detection system for detecting a flying avian in an airspace surrounding a wind turbine. The system may comprise a plurality of imaging systems, each imaging system comprising: a first imager having a wide field of view for detecting a moving object; a second imager having a high zoom, wherein the first and second imagers determine a position and a trajectory of a flying avian in the airspace; and a positioner operably connected to the second imager for positioning the second imager to image the moving object detected by the first imager. A processor is operably connected to receive image data from any of the first imager, second imager, or both, and to identify a moving object that is a flying avian based on the image data. There may be one processor for each imaging system or a single processor that is operably connected to each of the imaging systems. Each of the plurality of imaging systems is positioned relative to others of the imaging system to provide substantially complete hemispherical coverage of the airspace surrounding the wind turbine. A controller receives output from the processor, the controller operably connected to the wind turbine for decreasing or stopping wind turbine blades for a flying avian identified as at risk of otherwise striking a moving blade of the wind turbine.

The avian detection system may comprise at least four imaging systems, wherein: at least three of the imaging systems are mounted to a wind turbine or a stand-alone support structure such as a stand-alone tower, not associated with wind generation, each of the three imaging systems aligned in a unique horizontally defined direction to provide 360° coverage by the at least three first imagers up to a vertical distance; and at least one imaging system is mounted to a nacelle or a top surface of the wind turbine in a vertically defined direction to provide vertical coverage by the at least fourth first imager. Together the at least four imaging systems provide the substantially complete hemispherical coverage of the airspace surrounding the wind turbine or stand-alone structure, up to a distance that is greater than or equal to 600 m, including between 600 m and 1.2 km.

Any of the avian detection systems may be configured as a stand-alone system. For example, the stand-alone system may comprise a tower that supports the plurality of imaging systems; a plurality of wide field of view systems, each comprising a pair of first imagers; one or more stereo imagers, each stereo imager comprising a pair of second imagers; wherein the imaging systems are connected to the tower at a top end by a tower interface that positions the plurality of wide field of view systems in optical directions to provide a 360° view around the tower.

The avian detection system is compatible with any number of imagers and imaging systems, such as three wide field of view systems, each providing a field of view between 120° and 140° and at least one or one stereo imager. A ground enclosure may be provided containing ancillary equipment electrically connected to the plurality of imaging systems by cables that run through an inner passage within the tower. In this manner, the equipment may be reliably secured in an anti-tamper proof configuration, thereby minimizing risk of loss, damage or destruction. A lightning mitigation system may extend from the tower top, wherein the imaging systems are positioned so as to image airspace around the tower without optical obstruction by the lightning mitigation system. For example, for a plurality of stereo images, the lightning mitigation system may be positioned at an origin so that the mitigation system is not in an optical pathway. For a single stereo imaging the system, the relative positions are selected to minimize interference and, as necessary, a second spatially distinct stand-alone avian detection system may be positioned to ensure any blind spot is imaged by the second avian detection system, and/or to provide desired vertical coverage above the first avian detection system.

Any of the systems provided herein may be configured as a stand-alone system. "Stand-alone" refers to the system that is independent of any other structure. This is in contrast to systems configured to attach to structures having other function, such as wind turbines for energy generation.

The avian detection system may further comprise a plurality of wide field of view systems, each wide field of view system comprising a pair of first imagers forming an alignment angle with respect to each other to provide a field of view angle for each wide field of view system that is greater than or equal to 90° and less than or equal to 180°, wherein said plurality of wide field of view systems in combination provides 360° imaging coverage around said avian detection system; and a stereo imager comprising a pair of said second imagers. The stereo imager can rapidly be positioned with a positioner, such as a motorized pan tilt system, to focus on regions of interest identified by the WFOV system.

The system is compatible with a single stereo imager, which advantageously decreases hardware costs, as well as with a plurality of stereo imagers. While multiple stereo imagers increases costs, they can be beneficial for more detailed analysis and tracking, especially for a high number of birds present in multiple directions. In this manner, each of the wide field of view systems may be individually connected to a unique stereo imager.

Any of the systems may connect to a tower top by a tower interface. The avian detection system may further comprise a substrate having a top surface and a bottom surface, wherein the positioner connects the stereo imager to the substrate top surface and the wide field of view system is connected to the substrate bottom surface.

The tower interface may further comprise a central interface portion for supporting the stereo imager and connecting to a top portion of a tower; and outer support struts for supporting the wide field of view imagers.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
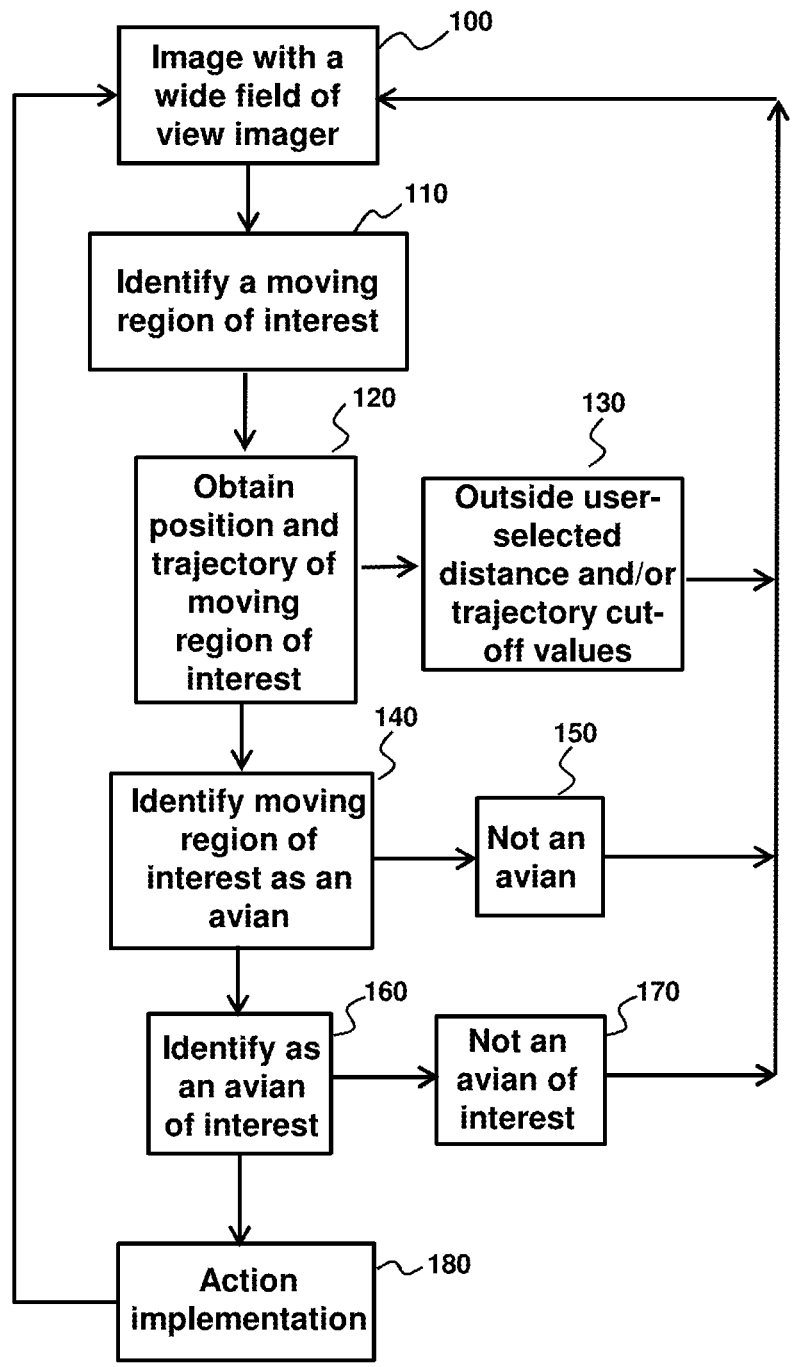
FIG. 1: Process flow diagram of a method of identifying an avian within an airspace and action implementation.

In general, the terms and phrases used herein have their art-recognized meaning, which can be found by reference to standard texts, journal references and contexts known to those skilled in the art. The following definitions are provided to clarify their specific use in the context of the invention.

"Avian" is used broadly herein to refer to a flying animal. Accordingly, the term encompasses birds, bats and insects. Particularly relevant avians for the methods and systems provided herein are flying animals that are endangered, threatened, or otherwise of commercial or environmental interest. In an aspect, the avian is a bird or a bat. In an aspect, the avian is an avian bird species of interest such as a raptor and/or eagle species that may be endangered or threatened. In an aspect, the avian species is a golden eagle.

"Airspace" is used herein to refer to a volume of space that surrounds the detection system. To clarify that the systems provided herein are configured to detect a flying avian in any observable direction from the system, the airspace is generally referred herein as hemispherical. In this context, "hemispherical airspace" refers to an all-directional coverage from a point of origin corresponding to an imager of the detection system. Accordingly, the imager(s) of the systems provided herein permit azimuth angle coverage $0°\leq\varphi\leq360°$ ($0°\leq\varphi\leq2\pi$ rad) (FIG. 3B); and inclination (or elevation) angle coverage $0°\leq\theta\leq180°$ ($0°\leq\varphi\leq\pi$ rad) (FIG. 2A) for a defined detection of interest distance up to a maximum distance corresponding to r (215 of FIG. 2A). The actual airspace corresponding to such a hemispherical detection may itself be non-hemispherical, reflecting real-world conditions where there may be obstructions to line of sight from an imager (FIG. 2B, top panel), dead space immediately above certain systems (FIG. 2B, bottom panel) or a plurality of spatially separated imagers (FIG. 3) that provide "bulging" hemispheres and the like.

"Substantially hemispherical" refers to a volume of airspace defined in terms of a center of origin and extending out a user-selected distance, but that may deviate from a true hemisphere volume, defined as $\frac{2}{3}\pi r^3$, for a half-hemisphere with the ground bisecting the hemisphere, where r is the average maximum detection distance from the center of origin, such as corresponding to the position of the avian detection system, as illustrated in FIG. 2B. In aspects where the volume is to be quantitatively expressed, the deviation may be expressed as less than about 20%, less than 10% or less than 5% of a hemisphere volume for a corresponding "average" distance, r, for the system. In addition, for a plurality of detection systems that are spatially positioned at different positions with respect to each other, the hemisphere may bulge outwards or inwards in certain locations while each individual system may have a generally half-hemisphere coverage shape. Irrespective of any such deviations, the systems and methods provided herein have a common feature of reliably detecting flying objects at a distance, including relatively large distances of up to about 600 m to 1.2 km, over visually observable directions defined as $0°\leq\varphi\leq360°$, $0°\leq\theta\leq180°$, and $0°\leq\theta\leq120°$. As desired, certain directions may have a larger detection distance than other directions. For example, depending on wind direction (and consequently blade face direction), a certain detection direction corresponding to the wind direction and perpendicular to the blade face may be extended. This can accommodate increased flying avian ground speed for a flying avian direction that is aligned with the wind. Accordingly, the airspace generally described as substantially hemispherical may include more elliptically-shaped airspaces with a major axis aligned with the wind direction. The major axis may be greater than 20%, 40% or 60% than the minor axis.

"Substantially complete hemispherical coverage" refers to airspace coverage, with respect to an origin corresponding to an imager(s) or sensor(s) that essentially covers all possible directions of approach of a flying animal toward the imager. In other words, provided is a complete line-of-sight coverage. Accordingly, as necessary additional systems may be utilized to cover any dead-space regions that do not have good line-of-sight coverage from a first system.

"Imager" refers to any devices that obtain images of airspace surrounding the system. The imager may comprise a camera, including associated optical components, such as lenses, sensors, filters, diffusers, and the like. Exemplary cameras include cameras having CCD or CMOS sensors. The image may be of visible light or non-visible light. For applications where the avian of interest tends to fly in the daylight and in non-storm/fog conditions, a visible light camera may be used. In contrast, for nocturnal avians that tend to fly in low-light conditions, such as bats, an infra-red camera that captures infra-red images may be used. To provide 24-hour coverage, both visible light and infra-red cameras may be used. "Sensor" is used herein as generally synonymous to imager, and reflects the systems can track moving objects without having to actually display an image to a user, but instead may be implemented with software to automatically track and take appropriate action depending on the tracked moving object.

"Positioner" is used broadly herein to refer to the ability to position the second imager to focus tightly, such as by zooming and/or focusing, on a moving object that may have been identified by the first imager. Accordingly, a positioner may be a motorized driver that actively aligns the second imager to a desired viewing direction. The positioner may continuously align the second imager with time so that a moving object is constantly zoomed in on and in focus with the moving object. The positioner may be a motorized pan and tilt to provide full spatial orientation of the second imager. Alternatively or in addition, the positioner may be implemented with a second imager that is functionally a digital zoom. In this aspect, the positioner may be functionally implemented within software to provide digital zoom of the output of the subset of pixels from the first imager.

"Processor" is used broadly herein and may include hardware, such as computers and computer-implemented processes. Examples of computer resources useful in the present systems and methods include microcomputers, such as a personal computer, multiprocessor computers, work station computers, computer clusters and grid computing cluster or suitable equivalents thereof. Preferably, algorithms and software provided herein are embedded in or recorded on any computer readable medium, such as a computer compact disc, floppy disc or magnetic tape or may be in the form of a hard disk or memory chip, such as random access memory or read only memory.

"Wide field of view" (WFOV) refers to an imager, generally a "first imager" that can image at least a substantial portion of the surrounding airspace. For example, a fish-eye lens may be used to image a substantially hemispherical airspace. Examples include imagers having a matched resolution to the WFOV area, such as resolution of about 4608×3280 (15.1 Mpixels) to provide a desired full field of view that is greater than or equal to 120°, such as about 130° FOV, when paired with an appropriate aligned second WFOV imager. For example, each WFOV imager may be selected to cover about 65° at about 800 m, so that combining a pair of such WFOV imagers provides 130° FOV and, therefore, can accommodate some lens distortion. The WFOV imagers may provide independent inspection areas or may be stitched together. Imagers configured to provide independent inspection areas can, depending on the image processing and analysis, be faster. As desired, the WFOV imagers may be periodically calibrated to ensure accuracy. A Kalman filter may be employed for predictive tracking behavior. A configurable auto exposure and other settings may be used to improve accuracy.

"High zoom" refers to an imager, generally a second imager or a stereo imager, configured to tightly focus on a potential or detected moving object identified by the first wide field of view imager. The high zoom may have a variable focal distance that is capable of achieving large focal length factors. In embodiments, the high zoom provides a high degree of image magnification, such as to access optical parameters of interest to assist with image classification, such as identification of a moving avian and upon such identification classifying or identification of a specific species or type of avian. The high zoom may also be referred to as having a "high resolution" tailored to the avian of interest that is being tracked, such as about 1280×960 resolution (1.2 Mega Pixel) to 1920×1440 resolution (2.8 Mega Pixel), and can be tailored to the operating conditions and avian of interest characteristics (e.g., size). In this manner, a sensor or imager and corresponding optical components are matched to generate an ideal pixel size in a CCD sensor space for optimized image quality in a confined field of view. Attendant optical components, such as high quality optical filters may be used. Examples of optical components used with the imagers include Tamron or Nikon 300 mm varifocal lenses. The high zoom may correspond to a stereo camera.

"Detection efficiency" is an indication of the reliability of the system in detecting an avian species of interest that enters the airspace and can be expressed as the number of avians of interest detected by the system divided by the total number of avians of interest that enter the airspace. The systems and methods provided herein may be described as having a high detection efficiency, such as greater than 95%, greater than 99%, or greater than 99.9% when active. Similarly, "false positive" refers to the number of avians identified as a species of interest that do not actually belong to the species of interest. This number is desirably small as otherwise there may be wasted resources associated with an action implementation for an avian erroneously identified as an avian species of interest. In an aspect, the percentage of false positives is less than 5%, less than 1% or less than 0.1%.

"Output of a subset of pixels" refers to a region of the digital image captured by an imager that may correspond to a moving region of interest. That moving region of interest is defined by a subset of pixels, wherein each pixel is associated with an intensity value. The subset of pixels may be described as being formed from neighboring pixels. "Neighboring pixels" refers to pixels that are within a user-defined pixel number of each other. In an aspect, neighboring pixels refers to pixels within about ten pixels of each other. The output may also comprise tightly clustered pixels that are described as being directly adjacent to each other. Of course, the subset may include a combination of neighboring and adjacent pixels.

"Time varying output" refers to the subset of pixels having an output that changes with time. This change may be associated with motion or movement of the subset of pixels and can be a useful parameter in image characterization and identification.

"Threshold identification attributes" refers to an initial characterization of a subset of pixels as corresponding to a moving object and upon which further analysis may be conducted. Examples include object distance, position, trajectory, boundary shape, size, color, and/or heat signature. Pixels and corresponding objects that tend to fail one or more threshold identification attributes are likely not a flying avian and so may be disregarded from further analysis or ignored.

"Edge detection" refers to systems, algorithms and processes that identify points or pixels in a digital image whose intensity or brightness changes, such as by a discontinuous change in light intensity. The various points or pixels having such sharp image brightness change are accordingly organized into line segments referred herein as an edge. Edge detection is useful herein in various image processes including detection of a moving object and classification of such objects. In an embodiment, the edge detection is by determining a gradient of intensity and classifying an object as having an edge for a gradient that exceeds a user-selected gradient of intensity. Such edge detection may be a useful part of obtaining a threshold identification attribute for the subset of pixels.

"Boundary parameter" refers to a parameter that is reflective of at least a portion of or all the edge of the subset of pixels. Examples of boundary parameter include edge shapes, total perimeter, interior area, intensity, and localized variations thereof. Particularly useful boundary parameters include those that may be compared against an edge boundary signature that is characteristic of a flying avian. For example, flying avians may have unique wing shapes, motion, curvatures and surface ruffling or roughness, with distinct front ends (e.g., head, beak, etc.) and back ends (e.g., tail feathers). Any such aspect that is characteristic of a flying avian is generally referred herein as to an "edge boundary signature characteristic of a flying avian" and may be utilized herein in a preliminary analysis of the subset of pixels to determine if further analysis is warranted.

"Reference values" refers to any parameter associated with a flying avian, including an avian of interest. The reference values may be obtained from empirical evidence, such as avian shapes, color, sizes, flying pattern, thermal signature, etc. Alternatively, the reference values may themselves be machine generated by visualizing a known avian and generating the parameters under real-world flying conditions. In this aspect, a trained avian such as a raptor can be used for image acquisition and according edge boundary signature determination that is characteristic of the trained avian. In an aspect, the trained avian is a golden eagle. As desired, any such reference values may be stored in a reference image database for use by any of the systems and methods provided herein.

"Avian identification parameter" refers to any parameter useful for determining whether a subset of pixels corresponds to a specific avian. Examples include size, speed, wing span, wing shape, color, boundary shape, geometry, light intensity, and flight trajectory. For an image that is an infra-red image, the parameter may correspond to temperature or a heat signature. Conceptually, the avian identification parameter may be similar to the edge boundary signature characteristic of a flying avian, but may be tailored toward a specific avian to provide enhanced species identification. The added computational resources and time for obtaining reliable avian identification parameters and using them for species identification makes this aspect useful only for those moving objects that have been defined as potentially avian from the initial boundary-related analysis.

Any of the systems described herein may have automated start and stop recording, such as based on weather conditions, daylight conditions and/or moving object detection. This facilitates raw recording from all imagers according to one or more configurable settings, such as factory pre-sets or user-selected setting. Examples of such a setting can be automating recording if a low or high priority object is tracked for longer than 0.5 seconds. Accordingly, the system may be run 24/7, with certain systems that are set to not record data at night for applications where night-time tracking is not desired. Alternatively, the system may be set to forced record if a noteworthy event has or recently occurred, such as a bird strike on a turbine.

The systems may have a custom logging script to provide pan tilt error assessment and appropriate corrections. For example, as wind turbines are generally located in exposed high-wind locations, high wind gusts may cause a pan tilt slip, and the error correction may reset the pan tilt to a desired position. As desired, pixel location may be converted and expressed in terms of degree relative to an origin, such as location of the imager. Manual control may be provided, such as user-control of the pan tilt system for a user-override of the second imager. For example, a user may manually click a location on a WFOV image so that the high resolution imagers automatically zoom on that location.

Any of the systems may include an auto exposure to optimize visibility through the day as lighting conditions vary, such as by varying one or more of exposure, gain and/or image quality. For example, during evening and early morning the high resolution imagers may log exposure time, with a maximum exposure time so as to not blur a bird moving at high speeds while not adversely impacting image quality required to make a high-accuracy avian characterization. Gain may be dynamically adjusted depending on the time of day, as toward evening light will keep getting dimmer.

EXAMPLE 1

Detection Methods

Referring to FIG. 1, an overall flow process of a general strategy for detecting a flying avian in an airspace is by imaging at least a portion of or all the airspace surrounding the system with a wide field of view imager 100. For example, in an unobstructed airspace a single wide field of view imager having a wide-angle optical system (see, e.g., U.S. Pat. No. 8,284,258) may image an entire hemisphere. Alternatively, for imagers that cover less than an entire hemisphere of surrounding airspace, a plurality of imagers may be used to provide complete hemispherical coverage. This may be particularly useful in situations where there is a physical obstruction, such as with a building, tower, tree, wind turbine nacelle, or the like. In such situations, more than one imager may be strategically located to provide multiple fields of view, that when combined, provide complete or substantially complete hemispherical coverage.

A wide field of view imager or imagers are useful for identifying a moving region of interest 110, which may be described in terms of an output of a subset of pixels of the imaged airspace. The moving region of interest may be detected or identified by comparing images of a field of view at different time points and detecting changes in the image, such as would occur with a moving object. One example of a technique is by determining changes in pixel intensity and identifying such a change in pixel intensity as a region of interest. Tracking movement of such a change in pixel intensity over time provides a moving region of interest. In an aspect, a plurality of moving regions of interest is identified, with each region individually tracked.

For a moving region of interest, distance of the moving region of interest relative from a user-selected geographical location may be obtained 120. For example, a second imager having a high zoom for focusing tightly on the region of interest, may provide distance information. For example, the level of zoom magnification corresponding to a highly focused image may provide information about the distance of the moving region of interest. Another example is a stereo imager that obtains a stereo image of the moving region of interest to measure distance from the moving region of interest and the stereo imager (see, e.g., U.S. Pat. No. 6,411,327; Mahammed et al. "Object Distance Measurement by Stereo VISION." IJSAIT 2(2): 5-8 (2013)). Other examples of a second imager include two camera systems, such as two charge coupled device (CCD) cameras. The methods and systems provided herein are compatible with a range of imagers and methods that provide distance information of an object being imaged. In this manner, distance of the moving region of interest from the systems provided herein is obtained. If the moving region of interest is outside a user-selected region, the region of interest may be characterized as outside the user-selected airspace with no further action taken 130. Alternatively, the moving region of interest may be periodically or continuously monitored to ensure it does not move within a distance that is within the user-defined airspace. Depending on the application of interest, the user-defined airspace is selected by a distance range.

As discussed, the user-selected distance range that defines the airspace of interest can be defined as between about 600 m to 1.2 km, and any sub-ranges thereof. Of course, other distance ranges are compatible with the devices and methods provided herein. For example, if a plurality of systems is provided to ensure substantially complete hemispherical coverage, the distances (and/or trajectories) for an individual system may be different so as to achieve a "final" airspace coverage around all possible approaches, thereby providing substantially hemispherical coverage with respect to a geographical point of origin.

For a moving region of interest, trajectory of the moving region of interest relative to a user-selected geographical location may be obtained 120. For example, the trajectory may be determined or characterized from a plurality of images over time to provide an average trajectory. Similarly, an anticipated or predicted trajectory may be determined based on the past trajectory. The predicted trajectory may be expressed in terms of a probable trajectory track, such as with outer trajectory confidence limits that define a percentage likelihood, such as a 50% likelihood, a 75% likelihood, a 90% likelihood or a 95% likelihood. Higher outer percentage limits increase the trajectory outer confidence limits. Any of the methods and systems provided herein may optionally implement an action based on a user-selected trajectory confidence limit (e.g., 50%, 75%, 90% or 95%) that intersects with a geographical point of interest. Conceptually, referring to FIG. 2A, each trajectory 240 from object 230 will have an envelope of trajectory outer limits along with an "average" predicted trajectory depicted by an arrow 240. This provides additional robustness and certainty to the aviation detection systems provided herein, particularly for applications requiring a stop-type action to a moving wind-turbine blade centered around 200 of FIG. 2A, such as within an actionable distance defined by dashed arrow 225 and corresponding dashed hemisphere surface 220.

In this manner, step 120 may be as simple as determining whether or not a moving region of interest is at a sufficiently "close" distance. Alternatively, the step 120 may be more complex by also considering a trajectory (see, e.g., elements 230 (object of interest distance) and 240 (object of interest trajectory) of FIG. 2A). Moving objects within a user selected distance (see, e.g., distance 215 of FIG. 2A) may be carefully monitored with trajectory 240 plotted: with no action required for moving objects having a trajectory away from 200, (see, e.g., 231) and action required for moving objects having a trajectory toward 200 (see, e.g., 232). In contrast, moving regions of interest determined to be outside the airspace defined by distance 215 (see, e.g., 230 of FIG. 2A) may be further monitored or ignored, until such time as the moving region of interest enters the airspace (see, e.g., 233).

For moving regions of interest that are within user-defined distances and optionally having a trajectory of interest, the moving region of interest is then examined in step 140 and identified as not an avian 150 or an avian 160. For example, if the moving region of interest is a piece of blowing debris, such as a leaf, a piece of refuse, or the like, the moving region of interest may be disregarded. Alternatively, if the moving region of interest is identified as an avian, optionally the next step is to characterize the avian, such as by determining the avian species or whether or not the avian corresponds to an avian species of interest 160.

The step of identifying a moving region of interest, as well as subsequent steps such as whether the region is an avian or an avian of interest, is compatible with any number of processes known in the art that provide rapid, reliable and robust image analysis, identification and/or recognition. For example, edge detection may be used with any of the methods and systems provided herein. Although many criteria and parameters are available for pattern recognition, one useful aspect is the straightness of the edge. An extremely straight edge or uniformly curving edge is indicative of an artificial object, such as an airplane, helicopter, hot-air balloon or other man-made object. Flying animals, in contrast, do not typically have such edges, but instead are feathered or otherwise not so straight or smooth. Accordingly, such a pattern recognition may be used to determine the moving region of interest is not an avian 150. If the avian is not an avian of interest 170, the avian (and the moving region of interest corresponding thereto) may be ignored.

In contrast, other edges may be highly indicative of an avian, such as tail feathers, wing feathers, wing tip, beaks, and the like. As desired, multiple such parameters may be used to further improve pattern recognition and avian classification. Similarly, for other animal species such as bats or insects, the edges associated with those animal species may be utilized in the one or more pattern recognition algorithms.

Accordingly, one unique aspect of the systems and methods provided herein is the reliable and efficient manner in which moving regions of interest (corresponding to subset of pixels) may be subsequently ignored (at least temporarily), including: outside a user-defined distance or trajectory or combination thereof; a moving region of interest that is not an avian; or a moving region of interest that is not an avian of interest. All these aspects assist in substantially reducing the number of false positive identifications, including to less than 10%, less than 5%, or less than 1% of the total number of identifications. Such a reduction in false positive is obtained without sacrificing avian detection sensitivity, such as a sensitivity so that greater than 10%, greater than 5%, or greater than 1% of all avians of interest entering the defined airspace are detected.

For an avian species of interest that is within the defined airspace and optionally headed in a trajectory defined by the user as being relevant, an action implementation 180 may be undertaken, dependent on the application of interest. For example, if the application is a simple avian count system, the action implementation may correspond to an increase in a count. If the application is an avian avoidance system, the application implementation may correspond to noise, light, or other signal deterrent to encourage the flying avian to change flight trajectory. If the application is with a wind turbine, the action implementation may correspond to decrease or stop of wind turbine blade speed to minimize risk of bird strike and/or injury to the bird or the equipment.

For systems having a plurality of wide field of view imagers, the process summary of FIG. 1 may then have a plurality of such processes feeding into a single action implementation step 180.

EXAMPLE 2

Hemispherical Coverage—Single and Plurality of Imaging Systems

Figure 2:
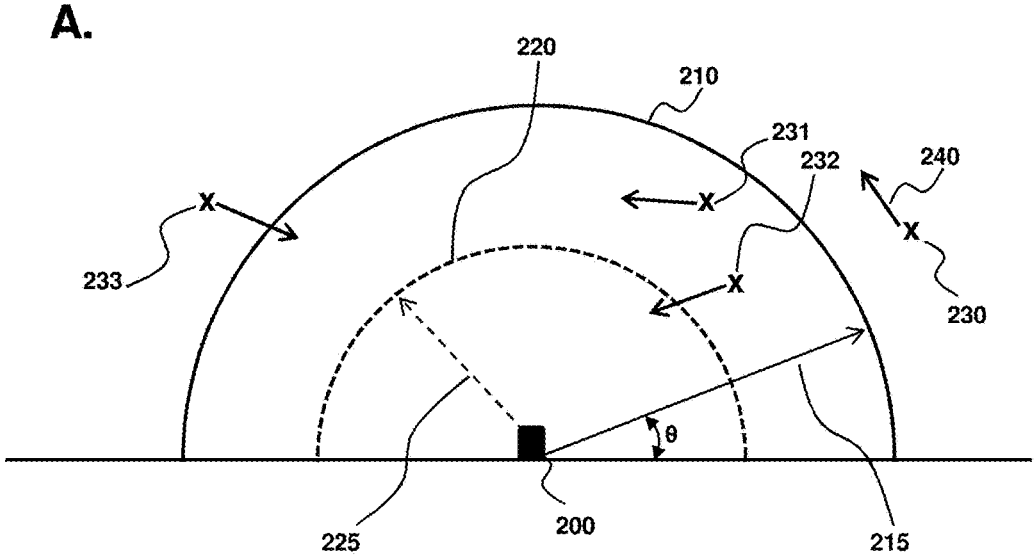
FIG. 2. Schematic side-view of a stand-alone avian detection system that provides hemispherical coverage (A) and substantially hemispherical coverage (B), with the bottom panel of B illustrating a central dead spot region that may be imaged by a second system to provide the hemispherical coverage illustrated in A.
Figure 2:
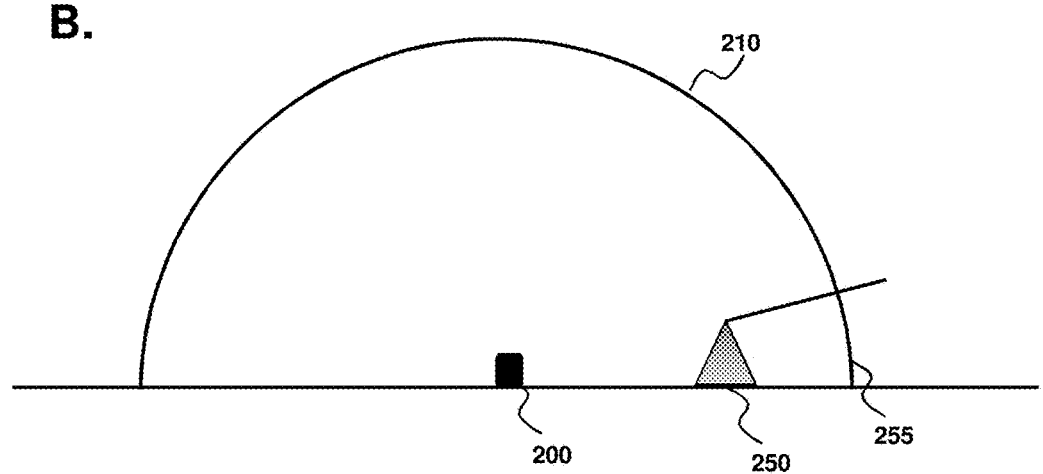
Figure 2:
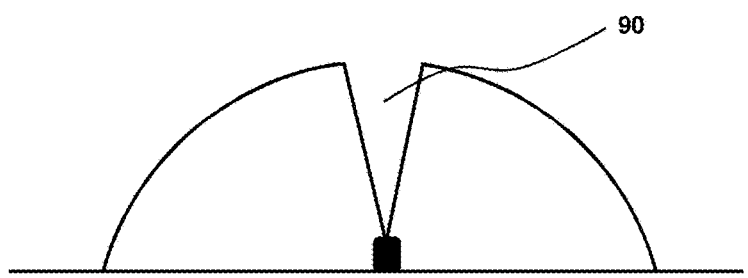
Figure 3:
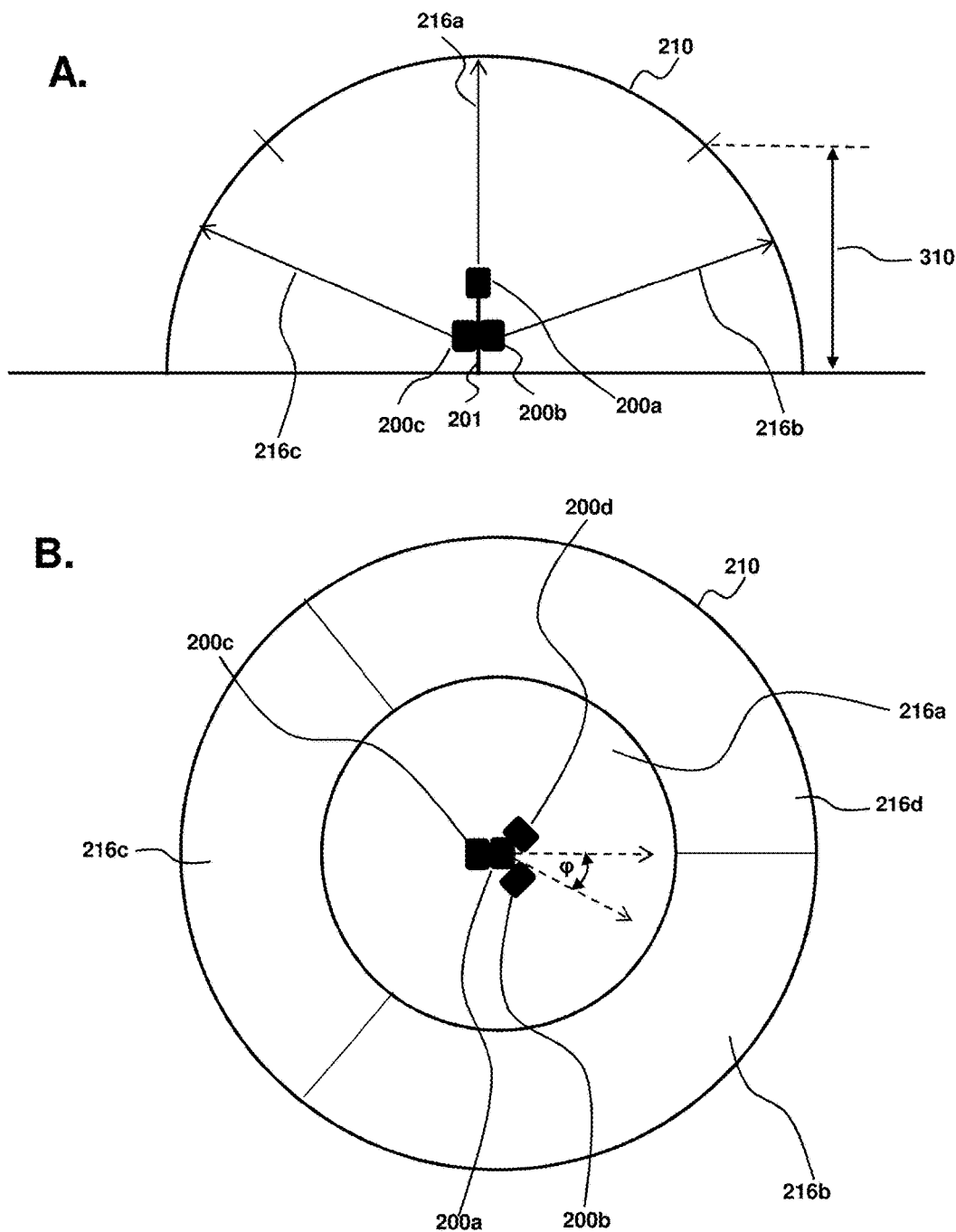
FIG. 3. Schematic side-view (A) and top-view (B) of a plurality of avian detection systems mounted to an object to obtain hemispherical coverage around the object. Each system is characterized as providing coverage over a defined air-space region.

Referring to FIGS. 2-3, the systems and methods provided herein provide good coverage over a well-defined airspace. FIG. 2A is a side view schematic of an avian detection system 200 for detecting a flying avian (230 231 232 233) in an airspace 210. In this example, airspace 210 is hemispherical and is defined by a distance 215. In contrast, FIG. 2B (top panel) illustrates an embodiment where there is an obstacle 250 that results in a volume of airspace that may be partially optically blocked 255. The obstacle may be an artificial object such as a building, tower or vehicle, or naturally occurring such as a hill, tree or boulder. Accordingly, the airspace may be described herein as being "substantially hemispherical" in recognition that unless the surrounding ground is flat and without obstruction, deviations from true hemispherical is expected. FIG. 2B further emphasizes that the term "substantially hemispherical" refers to a system configured to image all possible directions of approach of a flying avian toward the system 200 as to approach system 200 the avian at some point must enter the optically observable airspace. As described, a second system may be located to provide detailed coverage of the dead space or blind spot region 255. For another system, there may be a dead space 90 directly above system 200 (FIG. 2B, bottom panel). That dead space may be covered by employing a second system positioned away from the first system so that dead space 90 is imaged.

A flying avian has a position and a trajectory, defined by each of the four x's in FIG. 2A and corresponding vectors 240. Certain objects may be positioned outside the airspace of interest 210 and may be disregarded (see, e.g., 230). Other moving objects may be within the defined airspace (see, e.g., 231 and 232). Still other moving objects may move from outside the airspace of interest to inside the airspace of interest (see, e.g., 233) and, therefore, be subject to further analysis.

Airspace surrounding the system may be defined in terms of a distance 215 from the imager. For simplicity, FIG. 2A is a cross-section of a hemispherical airspace of a radius provided by distance 215. Of course, the systems and methods are not confined to true hemispherical shape airspaces. As desired, other volumes are contemplated. For example, the volume may bulge out or in in certain directions, depending on the application of interest. For avian strike applications around airport runways or planes, the airspace volume along the direction of air traffic may be favored, so that the hemisphere top-view cross-section is configured in a more ellipsoid shape to provide additional detection distance in the direction of airplane motion, with a relatively shorter distance in a direction perpendicular to direction of travel. Irrespective of the specific volume shape of the airspace, a common aspect of the systems and methods provided herein is reliable imaging and aviation detection for large airspaces in any approachable direction, with the resultant airspace that may be described in terms of an equivalent average hemispherical shape having an average radius selected from a range that is greater than or equal to about 500 m and less than or equal to about 2 km. In an aspect, the average radius is between about 800 m and 1.1 km, such as being sufficient to take an appropriate action step when an avian is detected in the airspace.

Depending on the application of interest, avians (231 232) within the airspace may be detected, but action taken only for an avian having a trajectory that would otherwise impinge on an actionable airspace volume defined by action distance 225 that is less than distance 215. Action distance 225 may be defined in terms of a percentage of distance 215, such as less than 80%, less than 60%, or less than 50%. For example, for a wind turbine application (e.g., system 200 mounted on or near a wind turbine), a flying avian 231 that is simply passing through an edge region of the airspace may not require an action implementation as there is a very low likelihood of a wind turbine strike. In contrast, an avian 232 that is headed toward a wind turbine may require an action implementation, such as stopping or at least decreasing a wind turbine blade speed. The avian 232 may be tracked and if the trajectory changes, the action implementation may be stopped. Similarly, regardless of avian trajectory, for a flying avian positioned within an action airspace (such as defined by the dashed lines of FIG. 2A), action implementation may occur automatically with the recognition that the avian is so close to the wind turbine, such as a wind turbine centered at a position corresponding to 200, that immediate action should be taken.

FIG. 3 illustrates a plurality of imaging systems 200*a* 200*b* 200*c* 200*d* in a side view (FIG. 3A) and a top view (FIG. 3B) and attached to an object 201 such as a wind turbine, a building, a tower, or the like. Similar to FIG. 2A, for simplicity the airspace surrounding the systems is illustrated as hemispherical. Of course, particularly for the multiple imager systems, the airspace may not be truly hemispherical, as each position of the imager having different heights and relative positions to potentially generate bulges and/or pinches in the airspace for a user-defined distance 215. Irrespective of any such non-uniformity, the airspace may still be defined in terms of a hemispherical volume with an effective volume that corresponds to the volume of the non-hemispherical airspace, as illustrated in FIG. 3.

FIG. 3 illustrates four imaging systems each responsible for imaging a portion of the airspace indicated by 216*a*-*d* (FIG. 3B), thereby providing substantially hemispherical coverage around object 201, such as a wind turbine. FIG. 3B top view is highly schematized for clarity to illustrate the geometrical configuration that provides substantially complete hemispherical coverage. Of course, there may be substantial overlap in the wide field of view between the first imagers of each of systems 216*a*-*d*, so long as the effective fields of view being imaged provide substantially complete hemispherical coverage. With respect to the relative positions of the imagers in each of the systems, the plurality of first imagers associated with each of 200*a*-*d* are arranged in distinct alignment directions indicated by 216*a*-*c* in FIG. 3A. Each of 200*b*-*d* may be described as imaging up to a vertical distance 310, with the remainder of the vertically directed airspace imaged by 200*a* arranged in a vertical alignment direction corresponding to the direction of the arrow 216*a*. As desired, the plurality of systems may then be described correspondingly as that described for FIG. 2.

EXAMPLE 3

Pattern Recognition Algorithms

Figure 4:
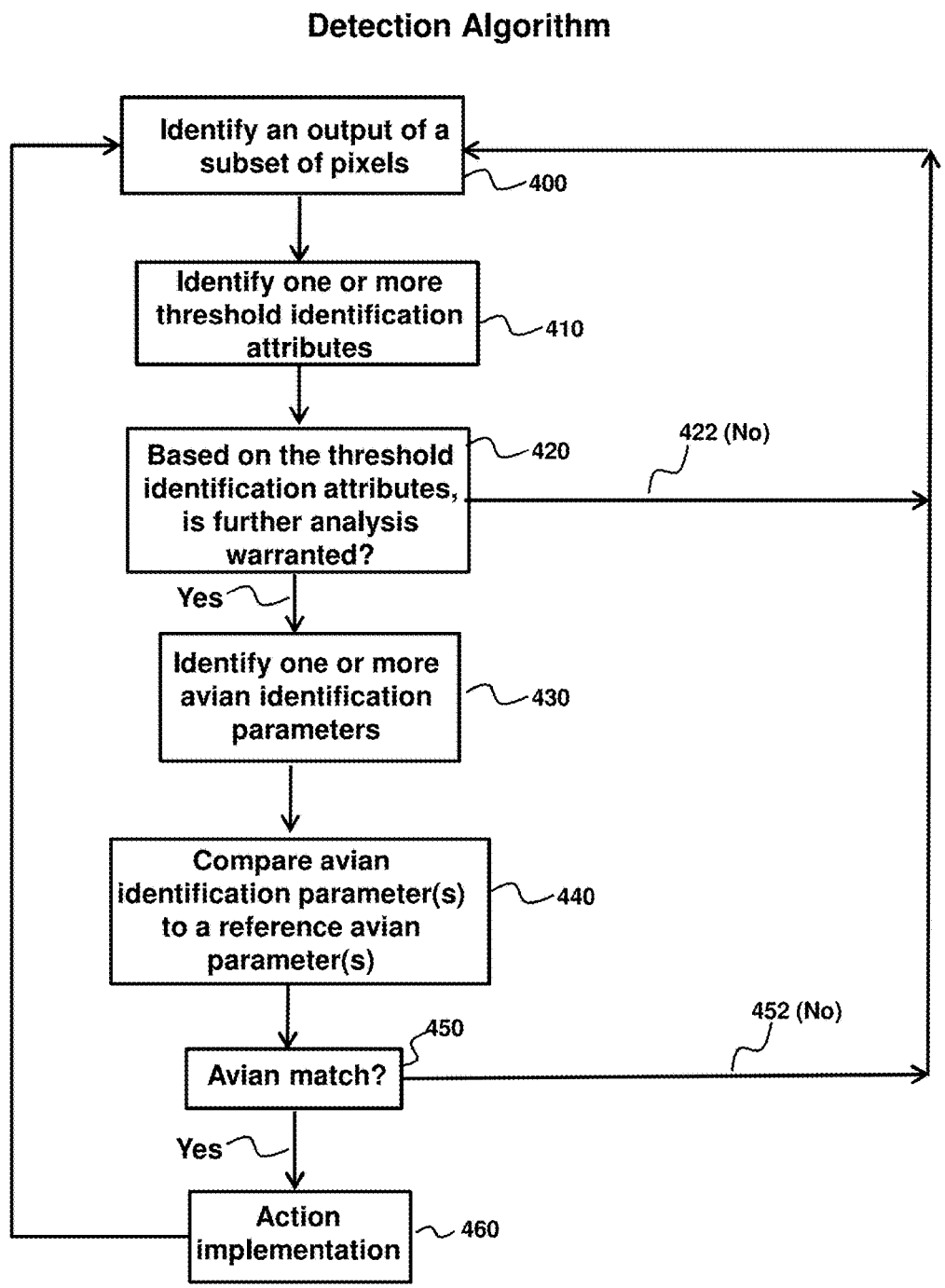
FIG. 4: Process flow diagram of an algorithm used to detect and identify a flying avian in an airspace surrounding the imaging system.

The systems and methods provided herein are compatible with any number of pattern recognition algorithms known in the art, including the process summarized in FIG. 1. Referring to FIG. 4, a more detailed description of an algorithm is provided herein. The first imager identifies an output of a subset of pixels from the field of view 400, such as an array of intensity values. From the output of the subset of pixels, one or more threshold identification attributes are identified 410 and used to determine whether further analysis is warranted 420. The threshold identification attributes may be a signature that is characteristic of a flying avian. The threshold identification attribute may be a characteristic of the pixel arrangement, intensity, distance, time evolution (e.g., position, distance and/or trajectory). A common aspect of the threshold identification attribute(s) is that it provides the capability of quickly and reliably determining whether the subset of pixels warrants further analysis. Examples of threshold identification attributes include position and/or trajectory, with pixels corresponding to a moving object outside a user defined airspace suggesting that no further analysis is required. Other examples of threshold identification parameters include pixel spacing, pixel number, pixel movement, color, intensity gradient, edge boundary parameter including shape, time evolution, and combinations thereof.

As desired, a plurality of threshold identification attributes may be identified to provide added first-pass accuracy. If the one or more threshold identification attributes indicates further analysis is not warranted, further processing or analysis of that subset of pixels may be avoided, as indicated by 422 (No). Otherwise, additional analysis is performed, including identifying one or more avian identification parameters 430 to assist in avian identification and/or avian confirmation. Avian identification parameters can include one or more of size, color, color distribution, plumage, boundary shape, wing shape, speed, direction of motion, wing movement, and any other parameter known in the art to assist with avian identification. As desired, the avian identification parameters may be selected to correspond to a specific avian species, such as an eagle or raptor, including, for example, a golden eagle. The identified avian identification parameters from 430 are compared to corresponding reference values in step 440. For an avian match 450 that is affirmative an action implementation step 460 may occur. In contrast, if there is not an avian match, further analysis or tracking of that subset of pixels may end as indicated by arrow 452.

The subset of pixels may be in a region together and described as being neighboring pixels, adjacent pixels, or both. As indicative of a moving object, the output may be a time-varying output, a spatial-varying output, or both. For example, the output may change as the object moves to a different position in the field of view so that the subset of pixels changes position. Similarly, as the object approaches or moves away from the first imager, the absolute number of the subset of pixels may increase or decrease. Similarly, the absolute intensity values of the subset of pixels may increase or decrease with time or relative orientation of the moving object with the imager(s).

For wind farm turbine applications, it is particularly important that the system successfully track a moving object that may be an avian, even if there is a moving turbine blade in the field of view. Depending on the relative positions of the imager, the moving turbine blade and the avian, the turbine blade may be relatively far or close to the avian. For example, the turbine may be between the imager and the avian or the avian may be between the imager and the wind turbine. This is particularly relevant for applications where the imager is in a stand-alone configuration mounted on a tower. Accordingly, any of the systems provided herein may utilize a turbine masking algorithm, such as the algorithm summarized by the flow chart of FIG. 5. In this manner, reliable tracking is maintained even for a sensor that has both a bird and blade in the field of view.

Figure 5:
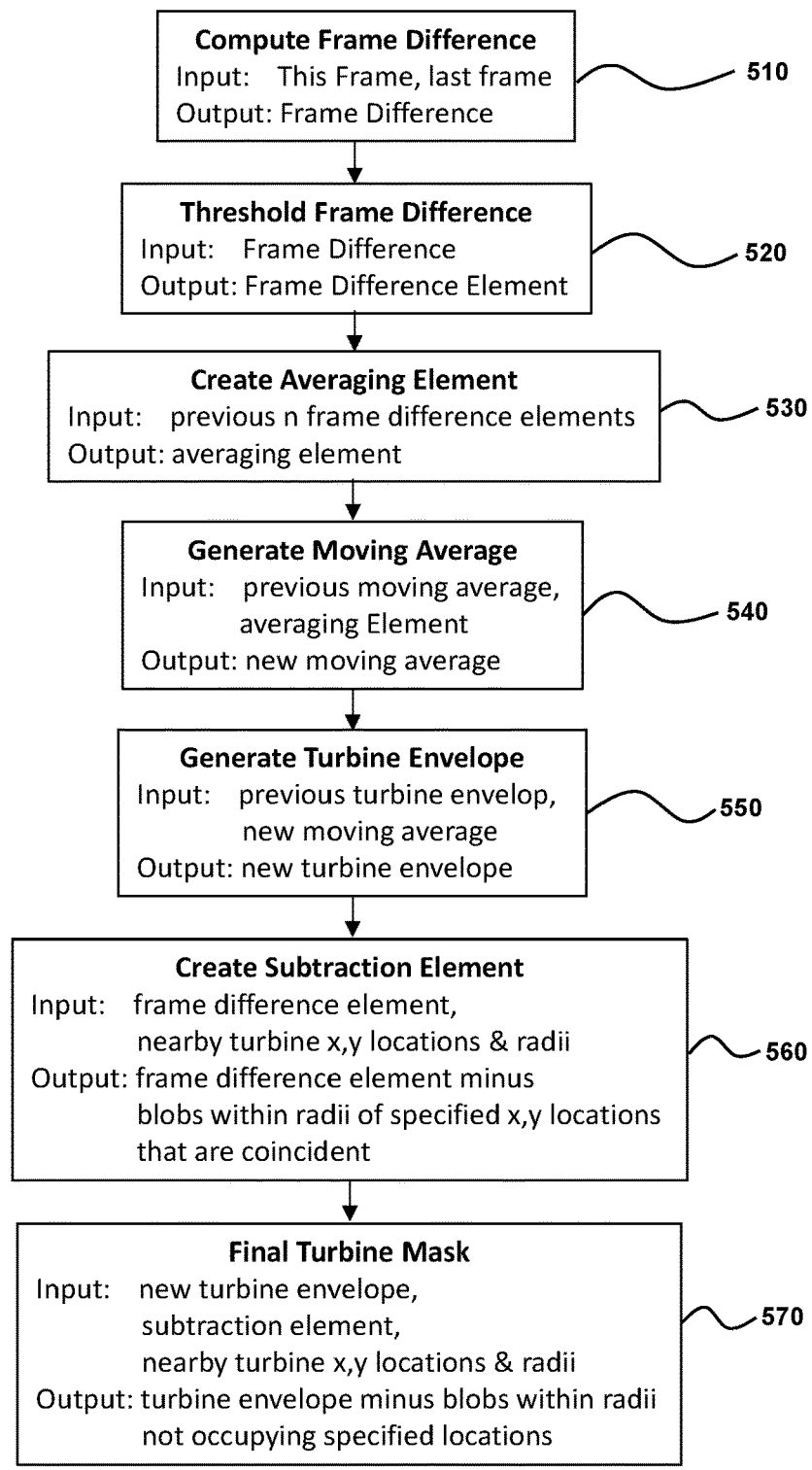
FIG. 5: Process flow diagram of a turbine masking algorithm for avian detection with an intervening wind turbine.

Referring to FIG. 5, in step 510 a frame difference is computed between an instant frame and last frame, with a corresponding output that is a frame difference. A threshold frame difference of step 520 outputs a frame difference element based on the frame difference of step 510. A plurality of frame difference elements, labelled "n" provides an output that is an averaging element in step 530 that is subsequently used in step 540 to output a new moving average. The new moving average is input with a previous turbine envelope to generate a new turbine envelope output in step 550. A subtraction element is created in step 560 for positions in the vicinity of the turbine and within a certain radius thereof. A final turbine mask is obtained in step 570 that is used to increase tracking reliability of a moving object in the vicinity of the turbine.

EXAMPLE 4

System Configuration

The detection system is designed to accommodate mild site maintenance and service. For stand-alone systems, options include a tower that can be tilted to the ground for servicing. Alternatively, a boom truck may lift a technician to the top of the imaging tower. Critical components are embedded in anti-tamper enclosures, including for the imaging tower, ground enclosures, and imaging pod.

Figure 6:
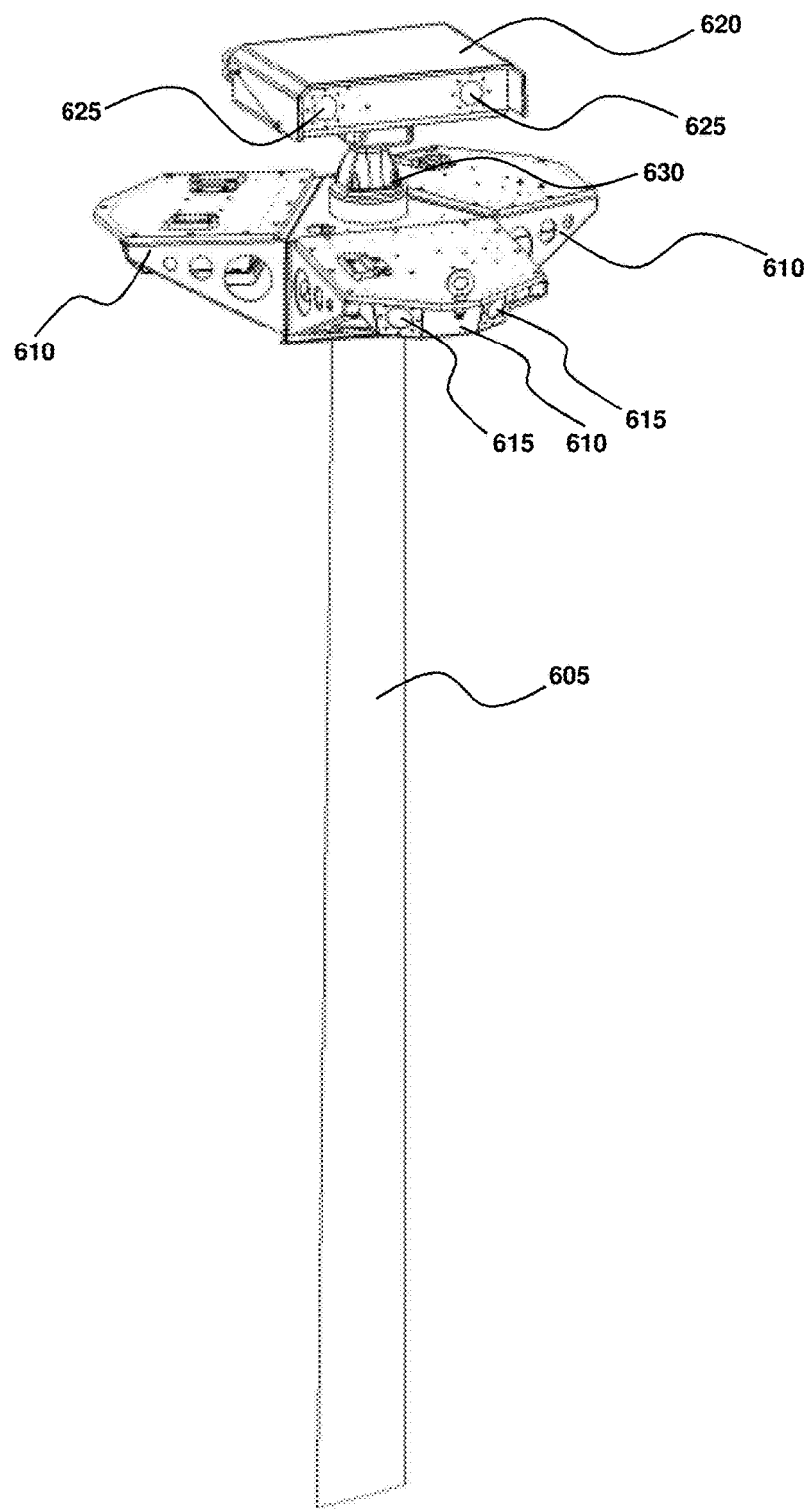
FIG. 6: Schematic illustration of an avian detection system mounted to a stand-alone tower.
Figure 7:
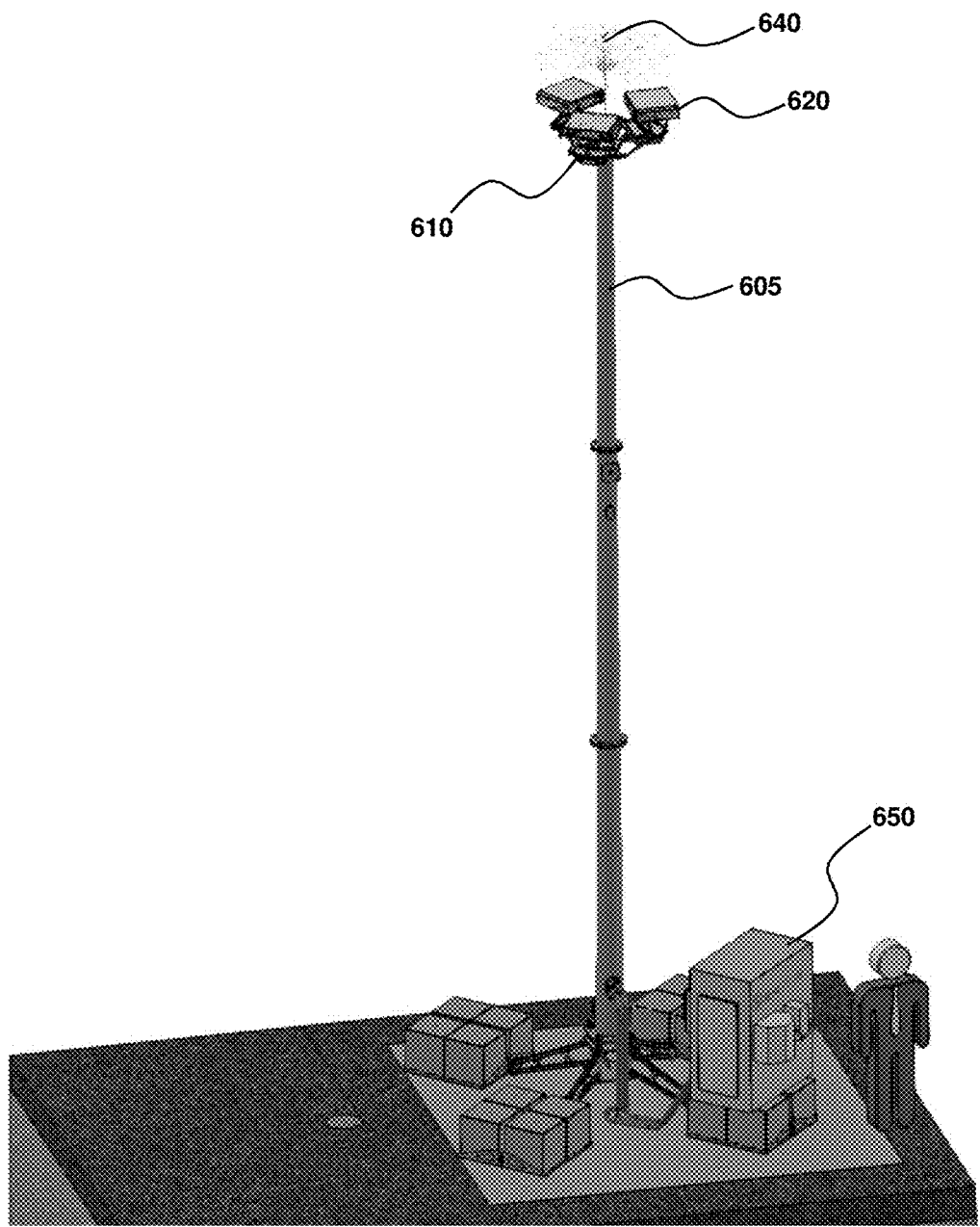
FIG. 7: Schematic illustration of an imaging tower with an avian detection system portion supported thereby, with cabling and ground enclosure to facilitate a self-contained and stand-alone system.

FIGS. 6-7 illustrate systems configured for positioning on top of a stand-alone tower, including a tower that may be transported and/or assembled at a desired location. In addition, the system may be integrated directly, or indirectly, with a wind turbine, as discussed. This may be a convenient alternative to placement on a wind turbine nacelle, as installation may occur without impacting or otherwise affecting wind turbines either during manufacture or post-installation in the field. Referring to FIG. 6, three WFOV imaging systems 610 are arranged to provide complete circumferential coverage around a stand-alone tower 605, with each imaging system 610 comprising a pair of WFOV first imagers 615. A second imaging system 620 comprising a high resolution camera 625, such as a stereo imaging system comprising a pair of high resolution imagers or cameras 625 provides detailed imaging and information for a moving object detected by the first imager(s). A pan tilt 630, a type of positioner, connects the second imaging system 620 to the tower and allows the second imaging system to move to focus on a region of interest identified by any of the first imaging systems 610 with the second imagers 625. The first imagers 615 of first imaging system 610 may be fixably positioned. In this example, there are three distinct first imaging systems 610, with each first imaging system comprising a pair of WFOV sensors or first imagers 615. In this manner, complete 360° coverage by the WFOV first imagers 615 is obtained with zoom capability provided by second imaging system 620 comprising a pair of second imagers 625, with a resultant total of eight video streams. To the extent a vertical airspace region coverage is desired, such as in the volume immediately above the system illustrated in FIG. 6, a second system that is positioned away from the system can provide such coverage for this first and second imaging systems that do not provide absolute vertical coverage.

Figure 8A:
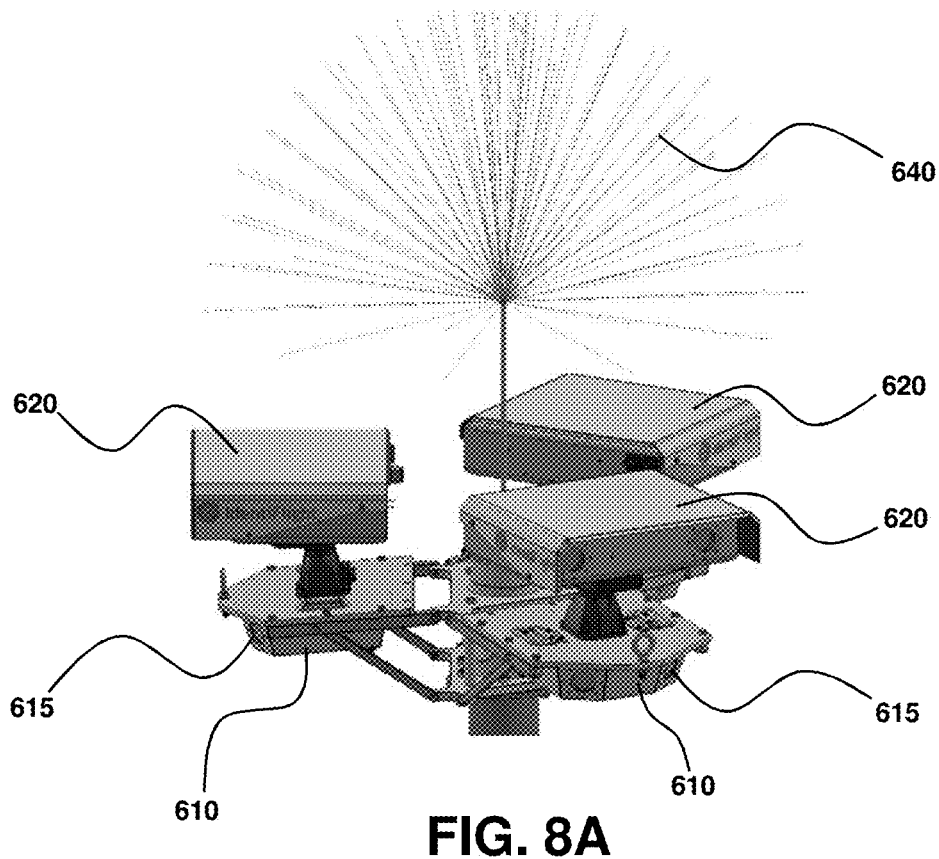
FIG. 8A is a schematic illustration of three sets of systems, each comprising a pair of wide field of view sensors to form a WFOV system and high-resolution sensors to form a stereo image sensor. An ionizing system ionizes air and reduces lightning strike risk.
Figure 8B:
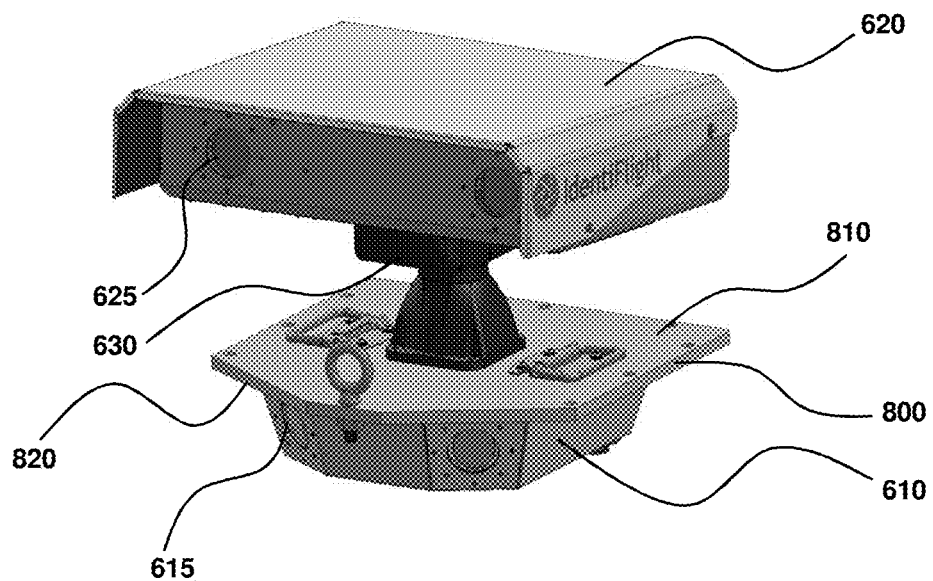
FIG. 8B is a close-up view of one of the systems of FIG. 8A, also referred herein as an "imaging pod" having both first and second imager systems, with each system formed from two imagers.
Figure 9:
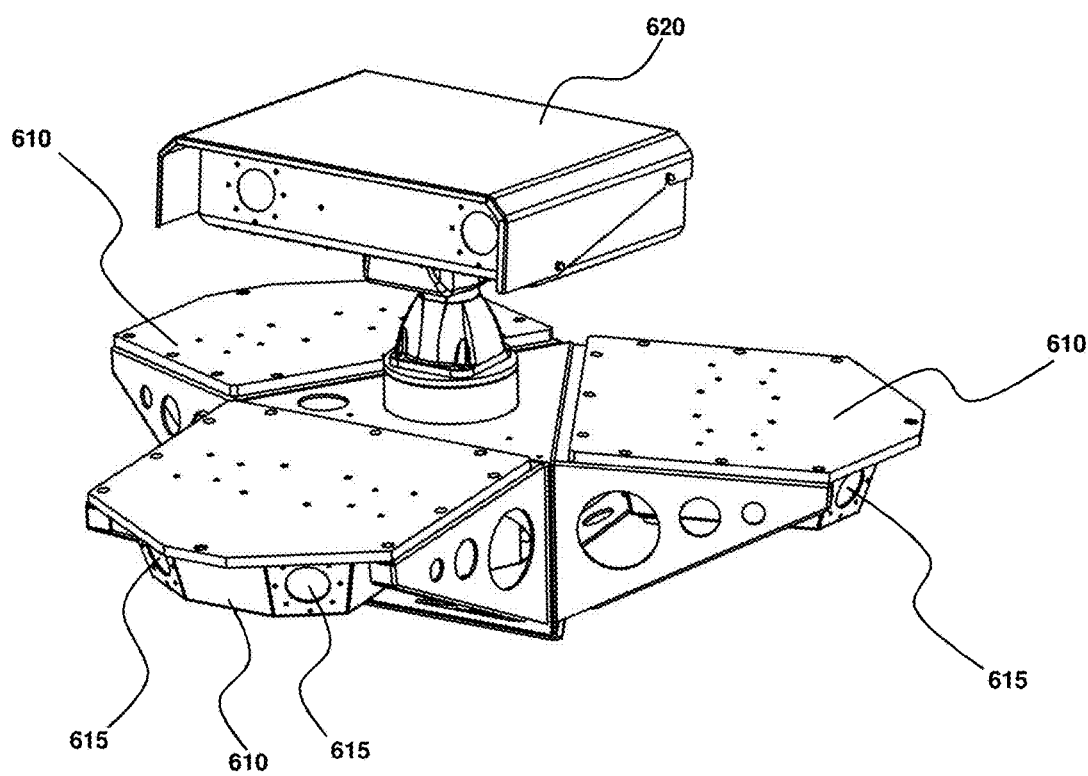
FIG. 9 is a schematic illustration of three pairs of wide field of view sensors, with one pair of high resolution stereo sensors forming a stereo imager system connected thereto with a pan-and-tilt.
Figure 10A:
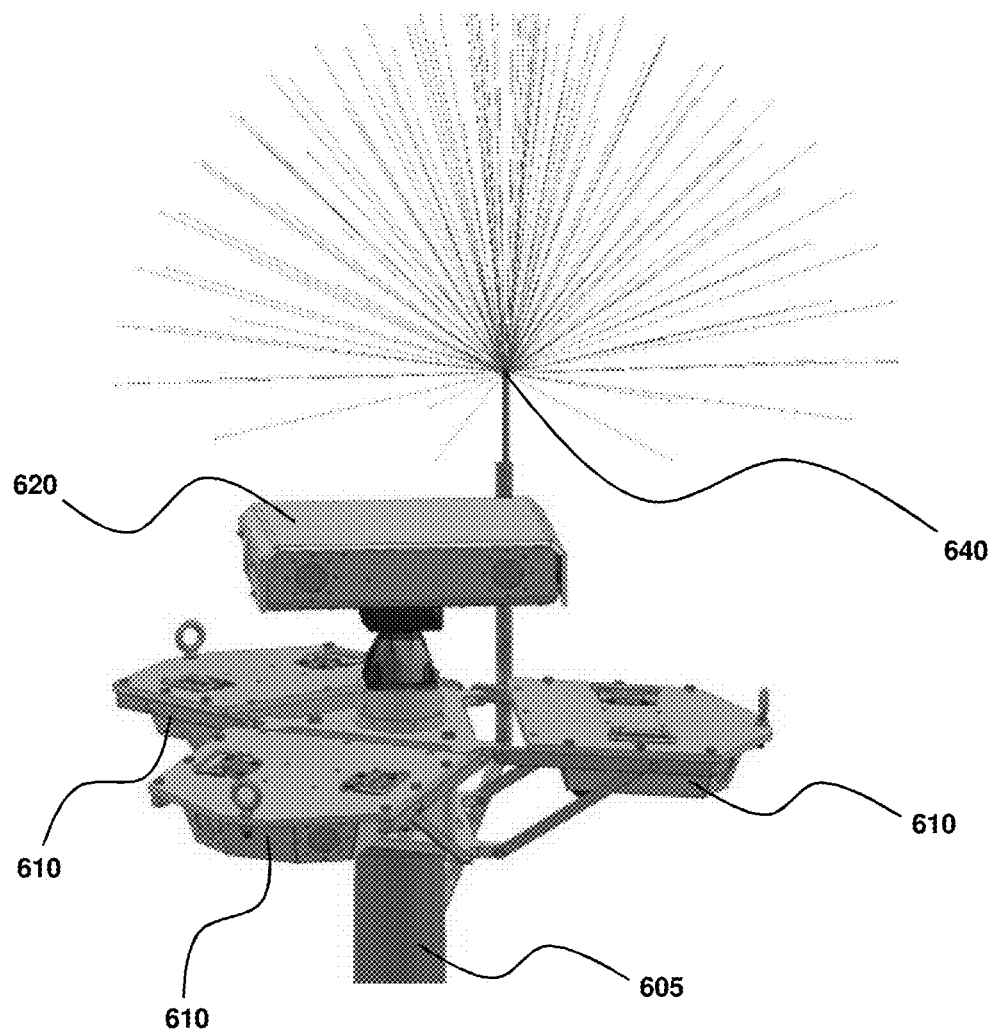
FIG. 10A illustrates the system of FIG. 9 supported to a top of a tower with an ionizer for minimizing lightning strike risk.
Figure 10B:
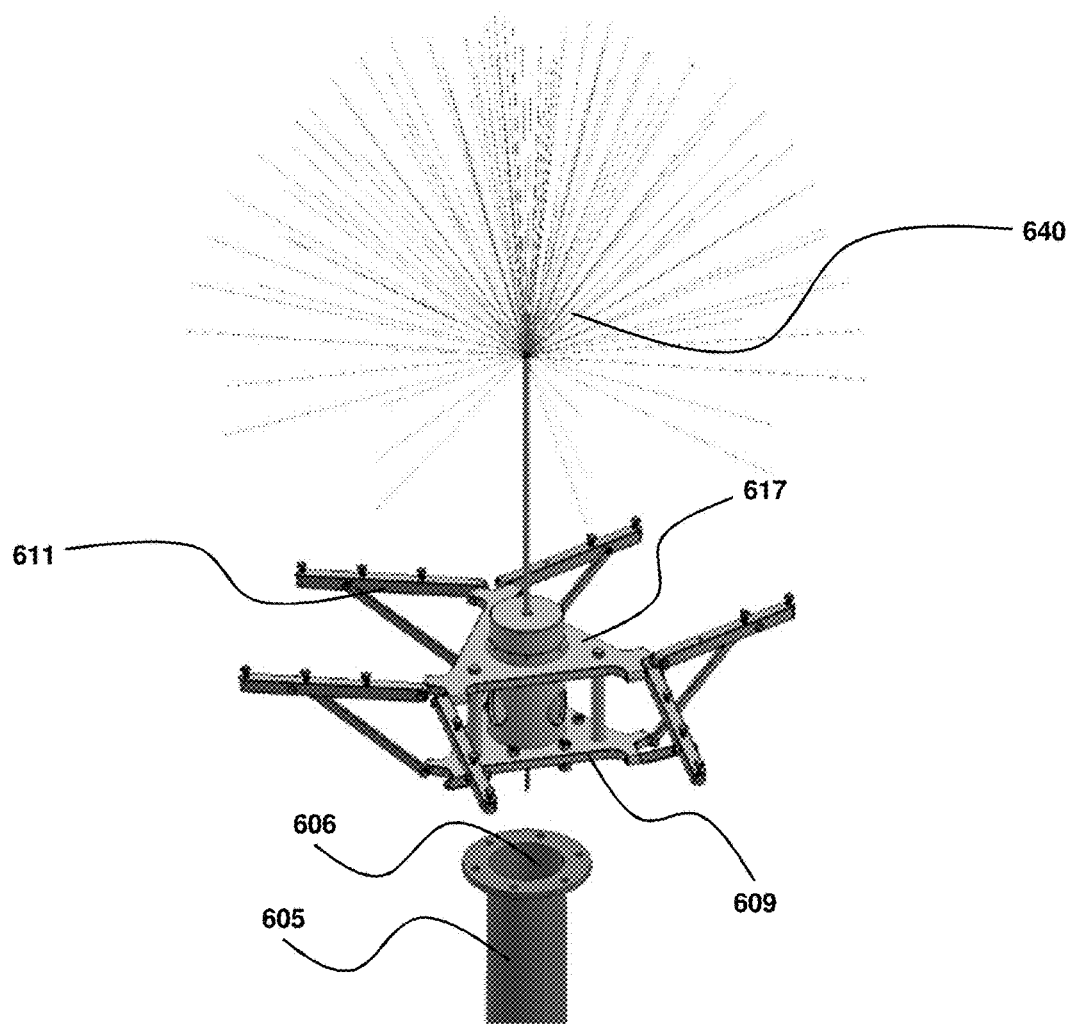
FIG. 10B illustrates a tower interface ready to connect to tower top and receive and support the various imager systems.

FIG. 7 illustrates a complete stand-alone avian detection system, including enclosure 650 for reliably and ruggedly enclosing sensitive electronic components and controller. In this illustration, the system comprises three imaging systems 610, each comprising a pair of first imagers 615, with a second imaging system 620 paired to each first imaging system, supported by tower 605. A lightning mitigation system 640 reduces risk of lightning strikes to the system. A close up view of the avian detection system imagers is provided in FIG. 8A and of one imaging pod comprising a first pair 615 and second pair 625 of imagers in FIG. 8B. A substrate 800 may be used to connect the positioner 630 to substrate top surface 810 and wide field of view system 610 to substrate bottom surface 820. This increases stability of the positioner, decreasing need for calibration. In addition, such an imaging pod can have a relatively small footprint (e.g., less than 45 cm×50 cm×45 cm (H×W×D), with a total mass of less than 22 kg. Another example of an avian detection system comprising a single high resolution stereo camera system 620 with three WFOV imaging systems 610 is illustrated in FIGS. 9-10A. For ease of installation and servicing, the tower interface may be modular in nature, as shown in FIGS. 10B. The imaging pods may be connected to tower 605 with a tower interface 609. The tower interface 609 is configured to support three imaging pods to provide the circumferential coverage around the tower 605 as shown in FIG. 8A. With modification to lightning mitigation system 640 position, the tower interface can support a separate single stereo imager (see, e.g., FIG. 10B). Cables may extend through an interior passage 606 in tower 605. The tower interface may have outer support struts 611 for supporting WFOV image systems and central interface portion 617 for connecting to a second imager, such as a stereo camera and to facilitate placement on a top end of a tower, all while ensuring reliable connection without impeding desired field of view, ease of installation, and ease of field maintenance and/or replacement. In particular, individual imaging systems of the system as a whole are readily replaced.

Figure 15:
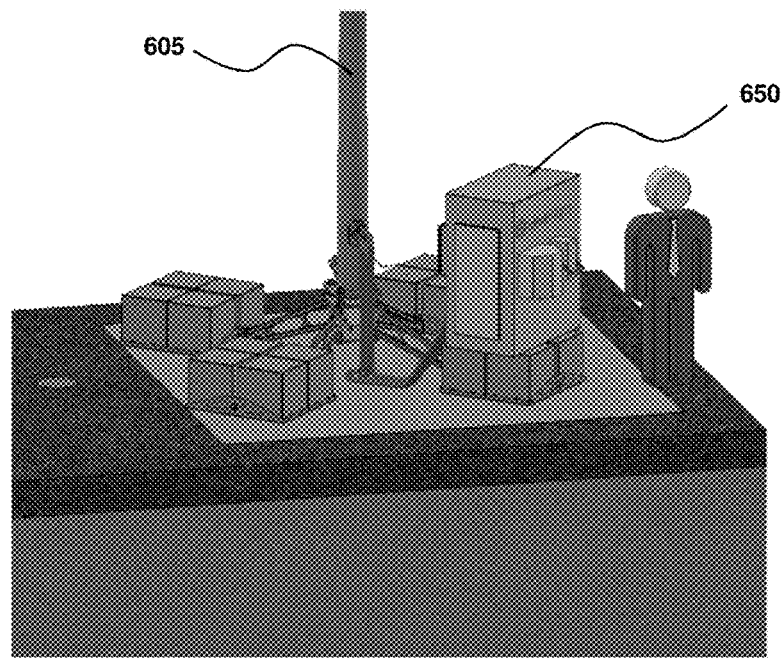
FIG. 15 is an overall illustration of the various components and ground equipment useful with the systems provided herein. For clarity, the top of the tower and corresponding imaging systems connected thereto is not shown. The top panel is a perspective view and the bottom panel a side view to illustrate the electrical ground to mitigate lightning strike and corresponding damage to the imaging system and related electronics.
Figure 15:
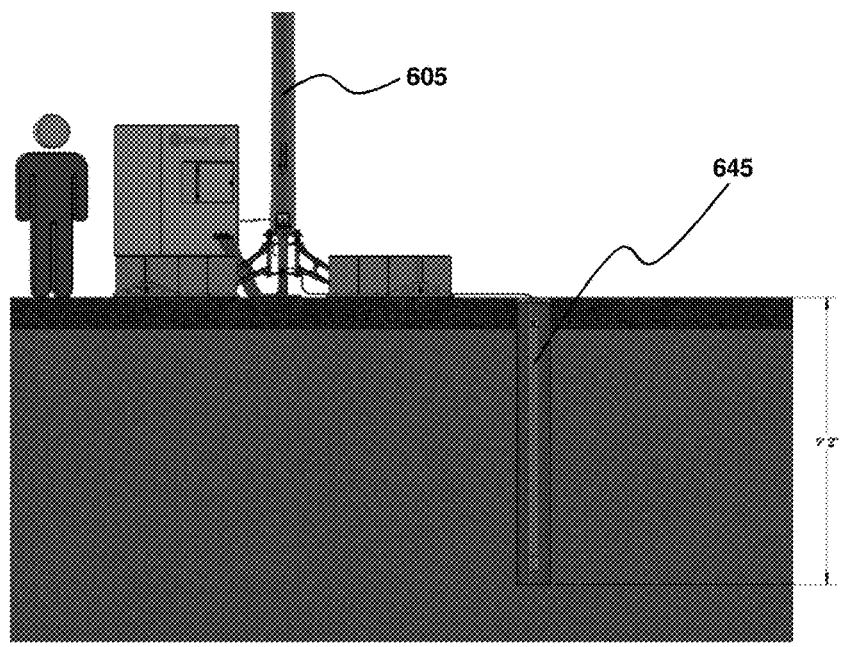

Lightning mitigation system 640 may be a lightning rod, or may be a system that ionizes the air surrounding the detection system imagers. The system may electrically connect to a single earthen rod, such as a chemical rod, in a 10 foot deep burial hole with access cover that is backfilled with conductive/dissipative soil (FIG. 15, bottom panel). The system is ideal for sand/aggregate soil having low conductive content.

The imaging tower 605 has an optimized height for avian detection and classification of between about 5 m and 10 m, or about 6.3 m or 9.1 m. The tower is configured for a load rating of 113.4 kg, with a ballasted base, such as precast cement blocks. A lift/lower mechanism may be handcranked or motorized to facilitate transport, deployment and maintenance.

Figure 11:
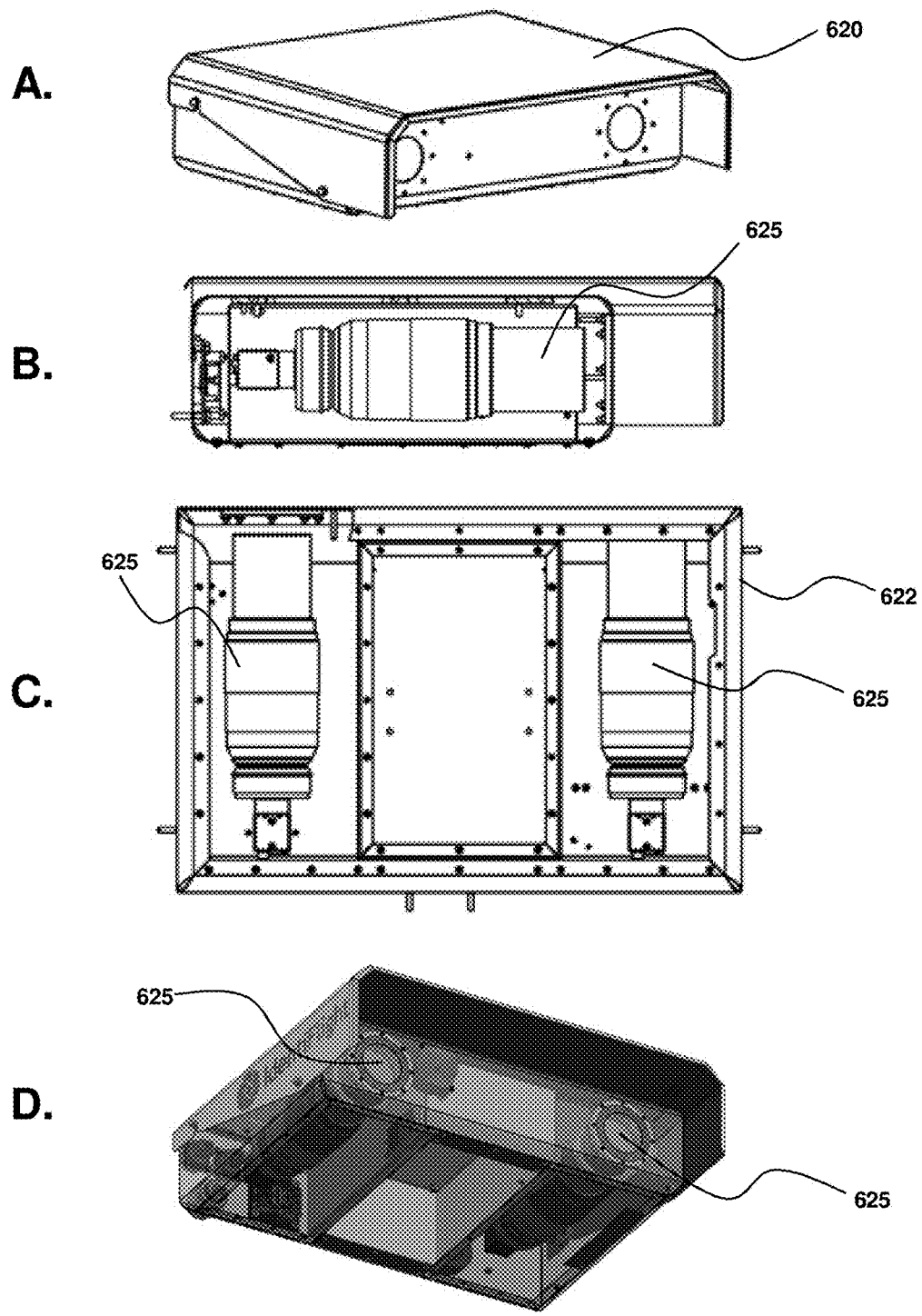
FIG. 11 is a schematic illustration of the stereo vision system, comprising a pair of high resolution sensors. A shows a perspective view, with the two sensing ends of the high resolution systems visible on the face, and protected from the elements by an overhanging cover. B is a side view. C is a bottom view. D is a perspective bottom view.

A more detailed illustration of a stereo imager 620 is provided in FIG. 11, panels A-D. A pair of high resolution sensors 625 are positioned within housing 622. A positioner, dependent on the WFOV imagers then directs the stereo imager 620 to a region of interest for additional analysis, such as region of interest distance, length, height, and/or color. Calibration of the stereo imager provides information as to errors in measuring distance for various distances. TABLE 1 summarizes the calibration results, with a reference distance a turbine and actual distance determined with a laser range finder. Avian wingspan is proportional to distance from the imager, so that any error in the distance leads to a corresponding error in determined wingspan. Maximum observed error, at a distance of 1.1 km, was 3.7%, which for a raptor wingspan of 77" corresponds to an error of about 2.85". This is within acceptable tolerance without unduly impacting wingspan length as a useful parameter for avian classification.

Further stereo camera measurement accuracy is achieved by finding a target point on the moving object for each imager of the stereo imager. The target point may be the centroid, with errors in the target point translating to distance errors. A one pixel error may cause an up to 20% distance error. Common centroids, therefore, are computed to sub-pixel accuracy by tuning both cameras similarly.

Other important aspects of the stereo vision system is a center of gravity closer to the axis of motion for reduced wind loading effect, structural rigidity for the imaging elements, a mass of less than 6 kg, with one camera fixed and the other camera adjustable for improved stereo alignment, and hydrophobic viewports for better imaging performance in mixed weather conditions. For low temperature operation, heating elements may be provided.

Figure 12:
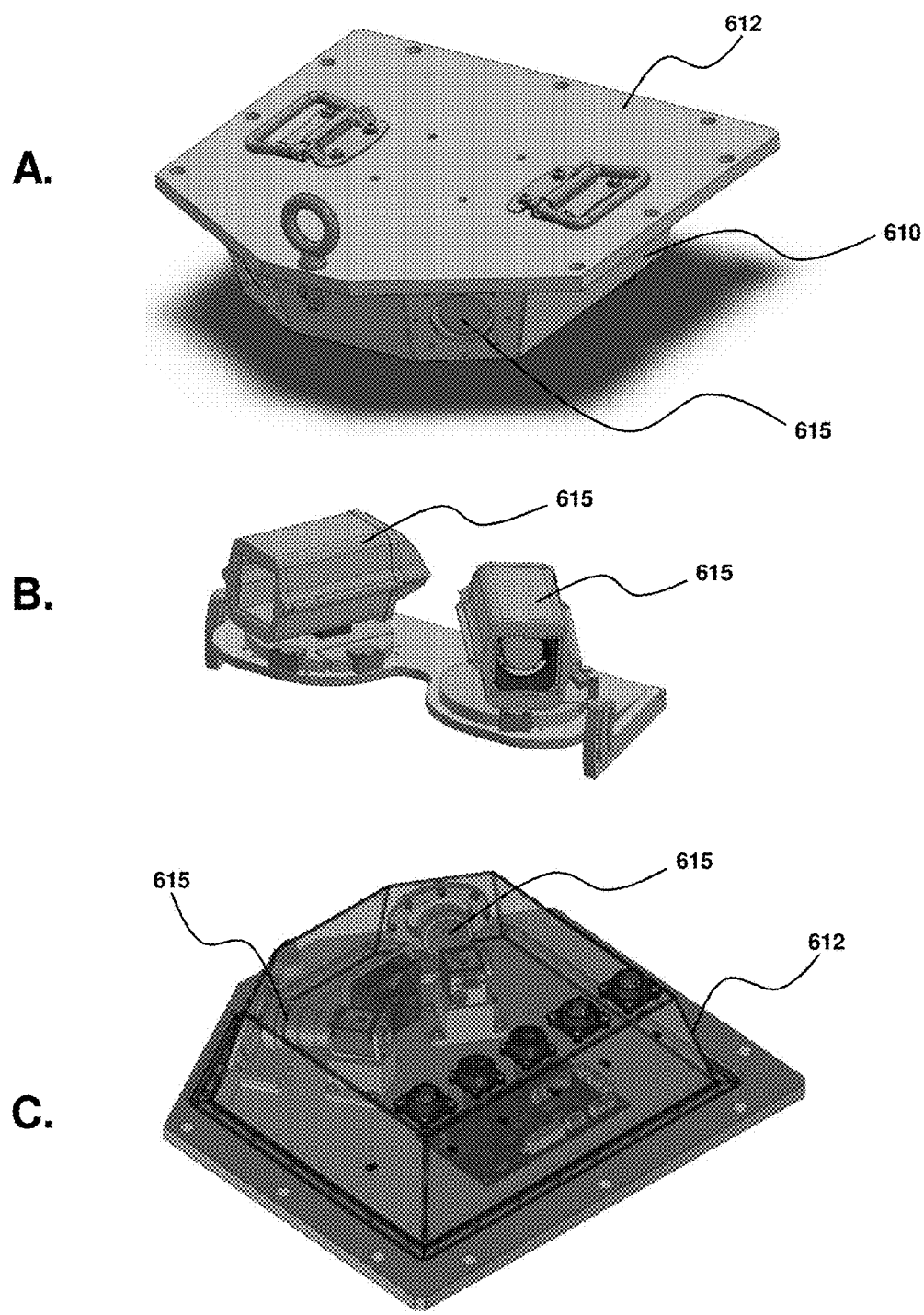
FIG. 12 is a schematic illustration of the wide field of view sensors, with A illustrating the outer cover that surrounds the sensors. B is a view of the pair of sensors positioned in the cover, such as at a relative angle with respect to each other of about 60°, with each sensor providing about 60° field of view coverage, and at least about 120° coverage. C is a view of the system of A flipped over to better illustrate the positions of the sensors within the outer cover.
Figure 13:
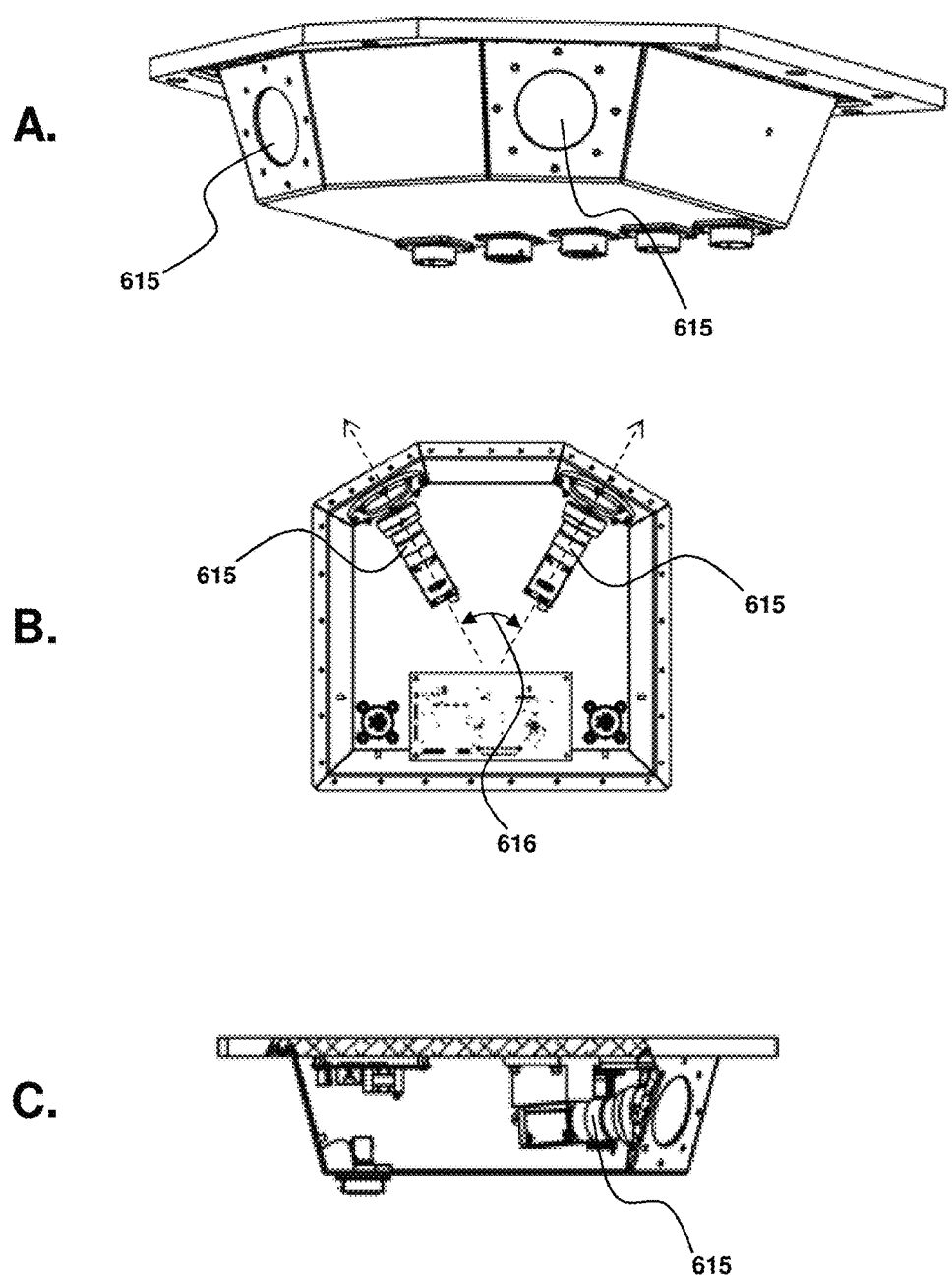
FIG. 13 is a schematic illustration of the wide field of view sensors of FIG. 12, from an A bottom perspective view; a B top view; and a C side view.

A more detailed illustration of WFOV or first imaging system 610 is provided in FIGS. 12-13, panels A-C. Each first imager or WFOV imaging system 610 may contain first imagers that are WFOV sensors 615, such as a pair of WFOV cameras extending along axes indicated as dashed lines in FIG. 13, panel B, having a separation angle 616 to provide desired airspace coverage, such as an angle between about 50° and 70°, or about 60°. The sensors may be cameras contained within WFOV housing 612. In this example, each WFOV imager 615 images about 65° at 800 m, so that the pair of WFOV imagers together images about 130° at 800 m. The pan tilt unit is integrated for rapid tracking of multiple different objects to maximize high resolution images from the second imaging system 620 of different birds and to avoid tracking a single object for long time periods. As desired, various setting are controllable to establish initial tracking priorities, continued tracking priorities, and a maximum number of degrees to move to another target. Generally, the imagers comprise a lens portion and a sensor portion, selected to provide the desired resolution and field of view for the application of interest.

Other aspects of the first imager system are that cameras may be in a fixed position and set for accurate location/relocation, improved imaging performance in variable weather conditions by tilting viewports relative to vertical to reduce obstruction and use of hydrophobic coating to decrease water beading. There is a common enclosure for both imagers and the imagers of the first imaging system may be mounted to the same substrate of the stereo imager of the second imager system. This increases the stability of the pan tilt calibration and reduces the potential for change/drift over time and environmental conditions.

Figure 14:
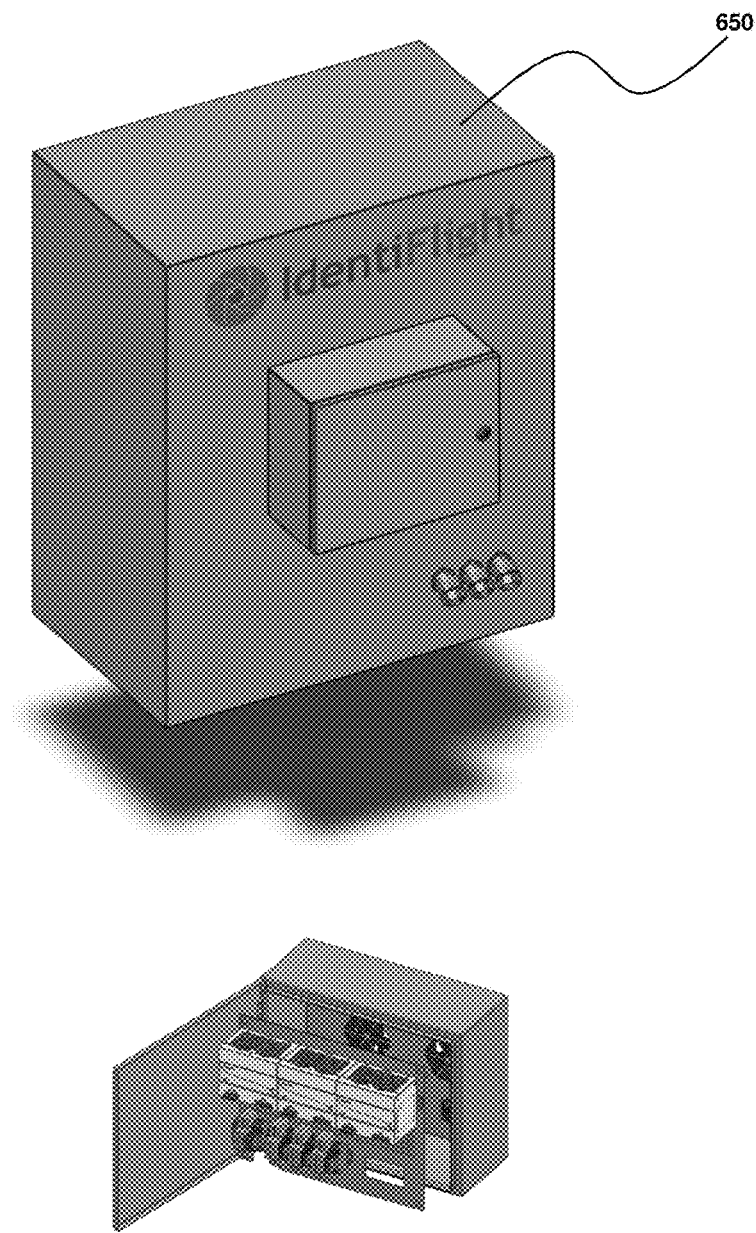
FIG. 14 illustrates a ground enclosure or self-contained equipment (top panel) and corresponding components contained therein (bottom panel).

A ground enclosure 650 (see, e.g., FIGS. 7 and 14-15) can be used to contain ancillary equipment, particularly for systems that are stand-alone and independent from any other structure, such as a wind turbine or radar and building structure. Exemplary ancillary equipment includes, computers, servers, controllers, power equipment, climate control, and electronic controllers for interfacing with a wind farm for wind farm applications, including a mitigation or wind turbine blade speed control. A/C to D/C power conversion may occur within the ground level enclosure, thereby further reducing the mass and thermal load on the tower. D/C to D/C power conversion may occur within each imaging pod to simplify power transmission cabling and reduce cabling cost. The cables are sealed and positioned within the bulkhead or tower passage, facilitating quick and efficient disconnection of imaging pods from the imaging tower. For an eight video stream system (e.g., six WFOV and two high resolution cameras), processing power requirements is about 500 Mbytes/sec, which may be handled by a single multi-core computer.

EXAMPLE 5

Field Test Results

Figure 16A:
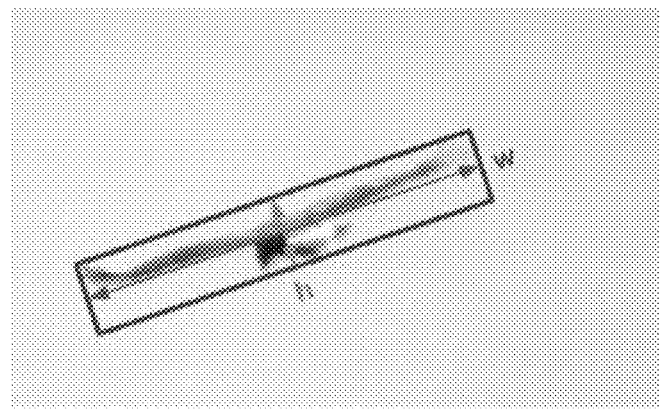
FIGS. 16A-16C are photographs of an avian with different posture or orientation. A ratio of the wingspan (w) and height (h) may be used to better estimate wingspan. This pose-estimation may be used to provide more accurate estimation of true wingspan, as summarized in the corresponding plot of FIG. 16D.
Figure 16B:
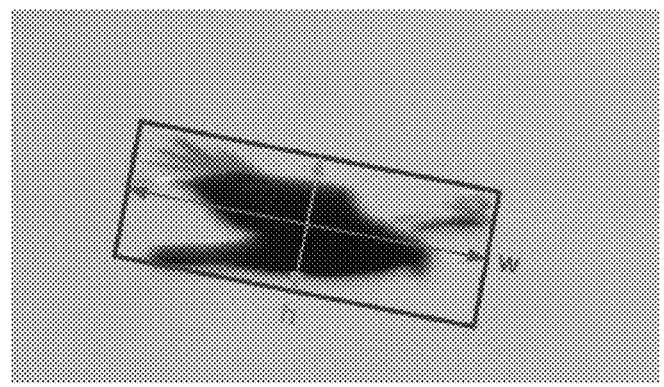
Figure 16C:
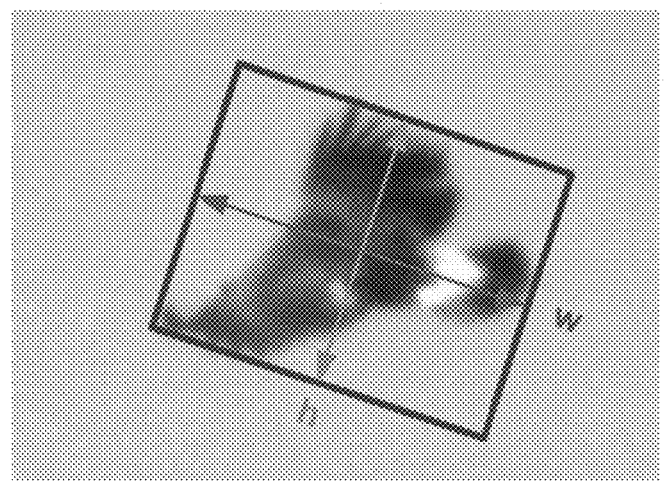
Figure 16D:
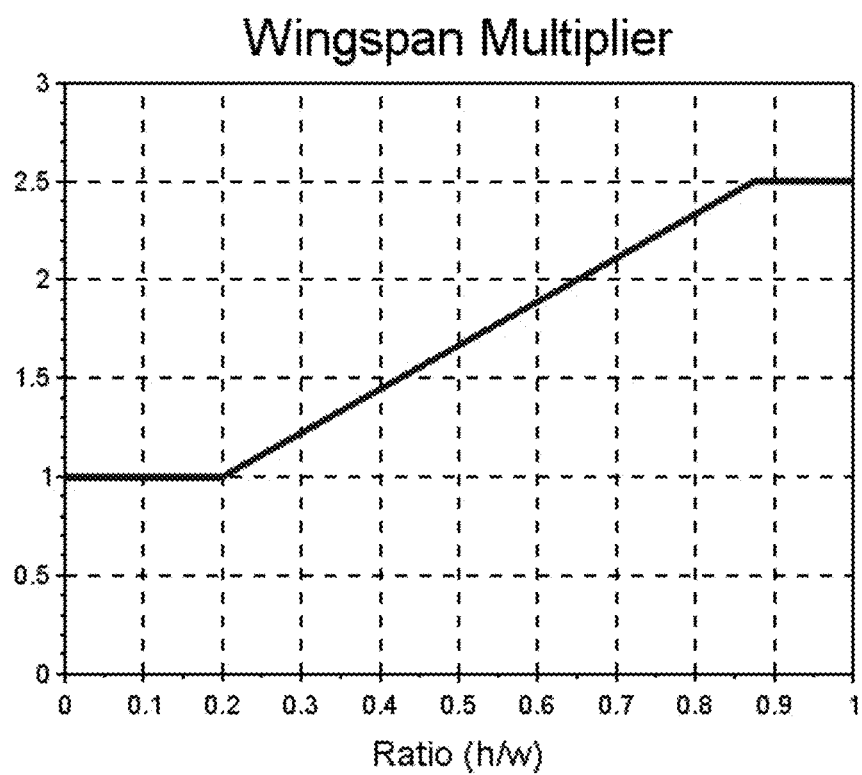

FIGS. 16A-16C are images of a raptor from the second imager, e.g., the high resolution stereo imager, illustrating different bird postures and their impact on observed wingspan. Accordingly, an important input in the avian analysis detection and classification is a ratio of wingspan (w) to height (h), or vice versa, because those dimensions vary with avian posture. FIG. 16D illustrates a corresponding wingspan multiplier as a function of the ratio h/w. This provides advantages over a simple heuristic method that estimates wingspan of birds oriented at various angles relative to the optical system. The technique provided herein where the ratio of w/h or h/w is used to obtain a wingspan multiplier is generally referred to as "pose-estimation". Even without such pose-estimation, the test system correctly identifies 92% of golden eagles as large raptors from measure wingspan alone.

Figure 17:
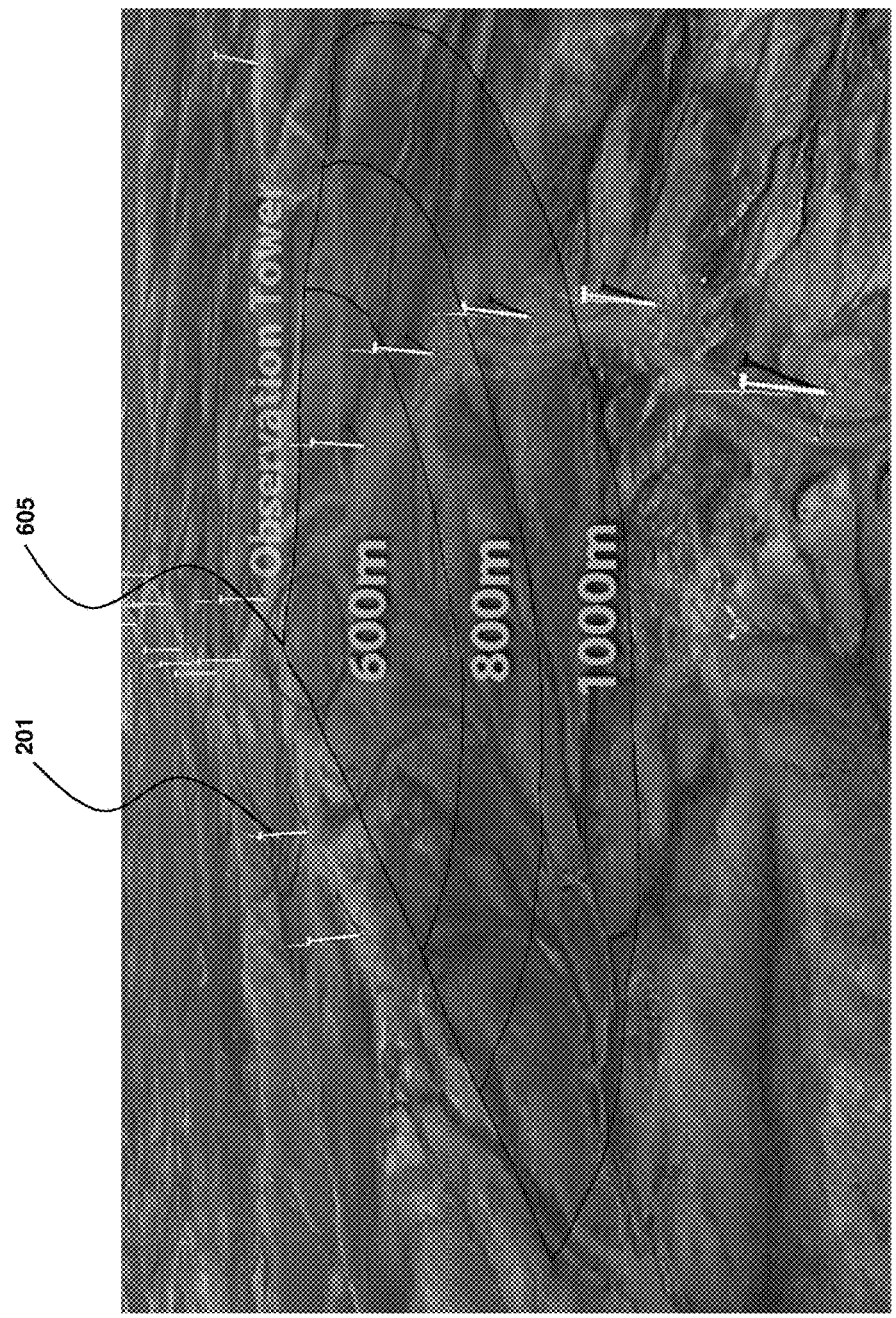
FIG. 17 is a schematic illustration of an observation tower supporting an avian detection system positioned within a wind-farm footprint. A 120° field-of-view provides coverage of a plurality of distinct wind turbines, including up to a distance of 1 km from the tower. Complete coverage is achieved by incorporating additional wide field of view (WFOV) sensors to provide 360° coverage, as desired. Additional systems may be positioned to cover other wind turbines. In this manner, significant reduction in hardware and costs are realized as fewer systems are required for complete coverage. This also illustrates the scalability of the instant systems, with any size of airspace that can be monitored with addition of more systems.

Referring to FIG. 17, an avian detection test system is installed in a wind farm as a stand-alone system, labelled as "observation tower" or tower 605 in FIG. 17. In this test, the WFOV corresponds to about 120°, with 600 m, 800 m and 1 km distance from the imager illustrated, along with ground topography and wind turbine 201 locations. Additional imagers may be employed to provide hemispherical coverage, including with additional 120° imager systems and/or additional "observation towers" at distinct geographical locations to provide an appropriate detection envelope with respect to each turbine. The test system is particularly useful in obtaining comprehensive data sets for use in optimization and validation of the detection system, thereby ensuring enhanced image quality and detection reliability. System durability in the field is also assessed.

Figure 18:
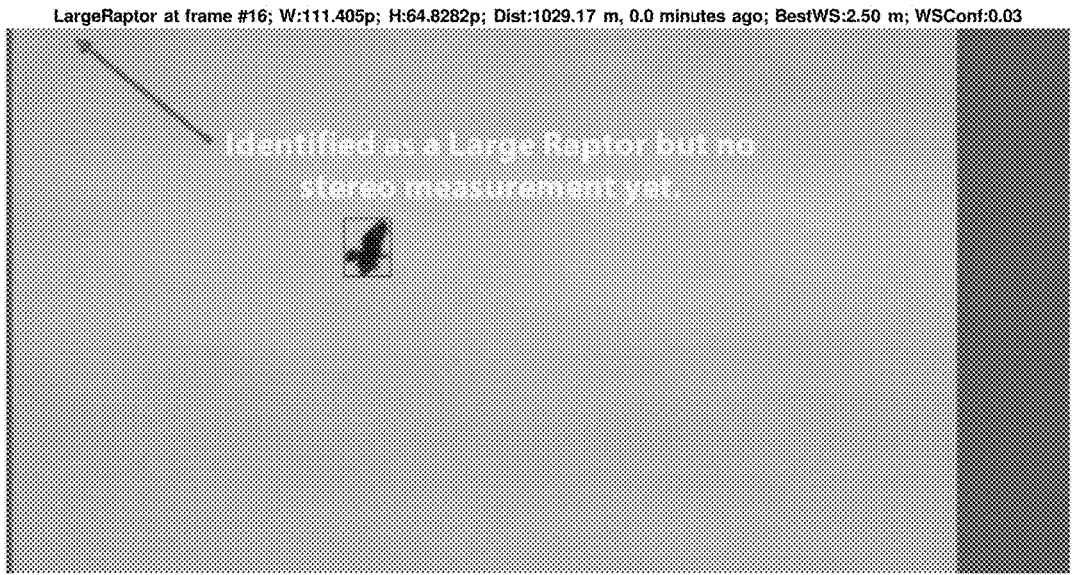
FIGS. 18-19 are photographs of a raptor before (FIG. 18) and after (FIG. 19) stereo measurement. The raptor distance is about 1 km from the system
Figure 19:
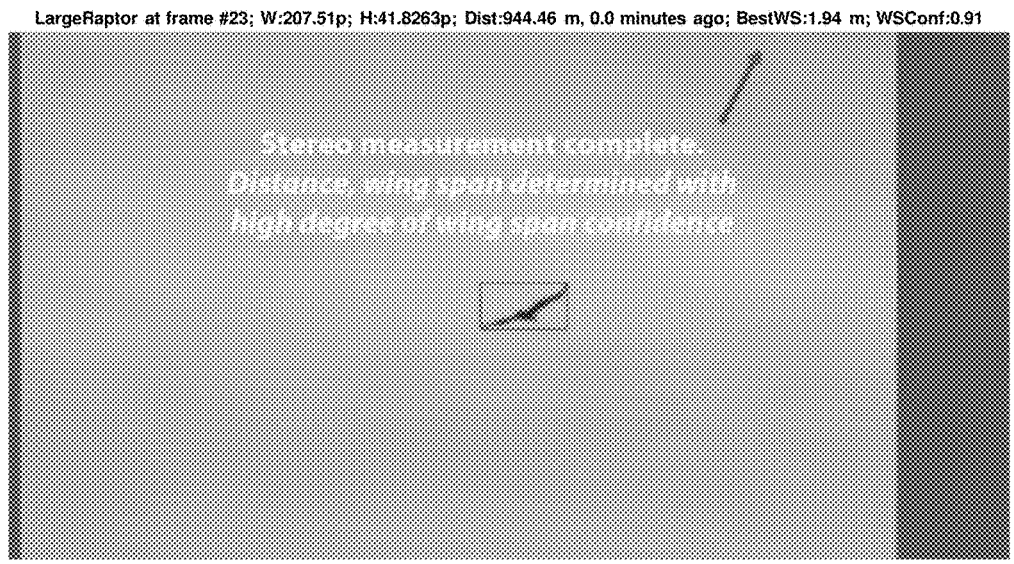
Figure 20:
FIG. 20 is a photograph of a system tracking a raptor. The top sensor image is from the high-resolution sensor and the bottom sensor image from the WFOV sensor, with the ground and wind turbines visible.
Figure 21:
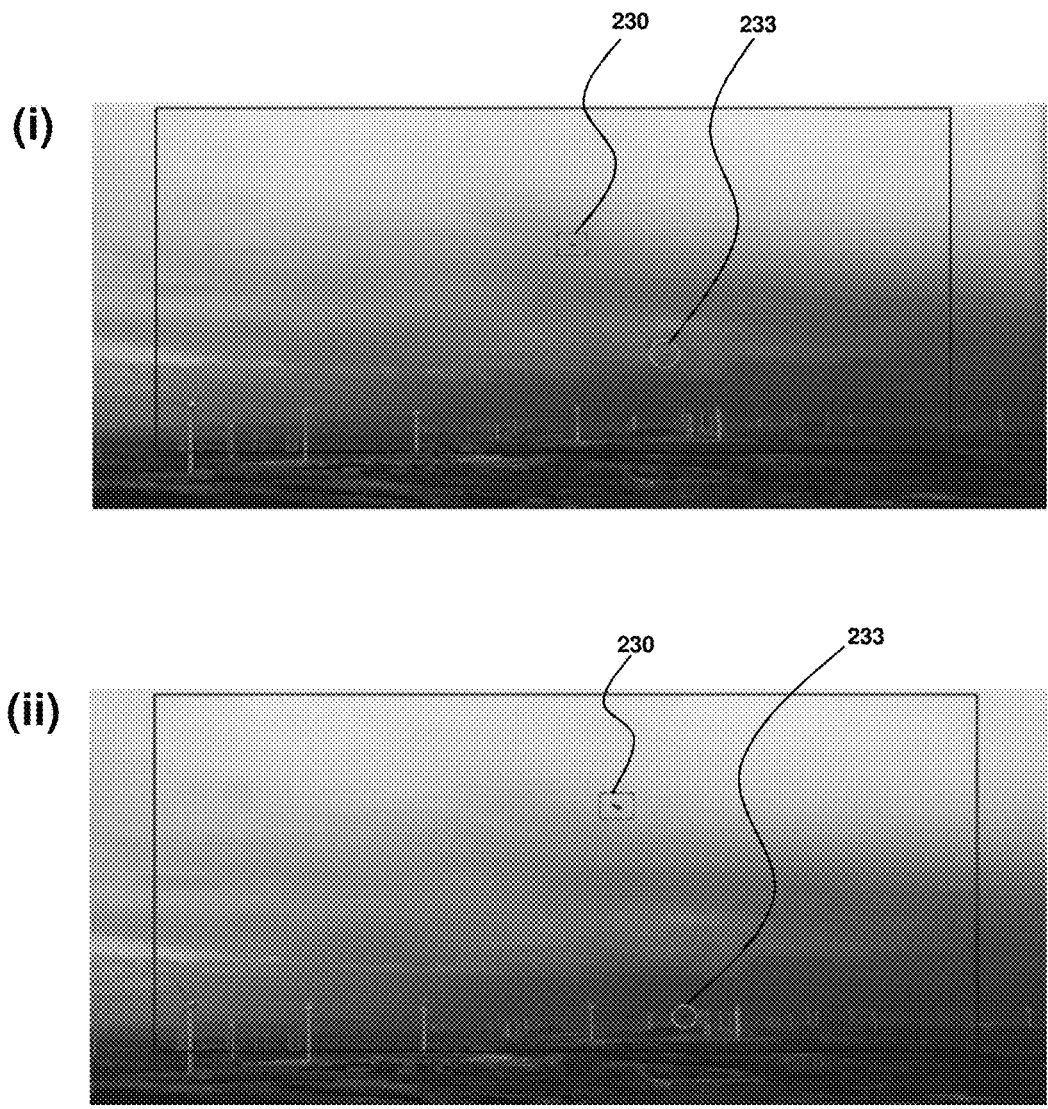
FIG. 21 is a series of sensor images labeled (i)-(v) of a pair of avians tracked in the WFOV, with a first avian maintaining a gliding height above the ground and wind turbines. A second avian approaches the ground as shown in panel (ii) and flies behind a turbine (iii) and closer along the ground (iv) before increasing height from the ground (v). Each avian is successfully tracked.
Figure 21:
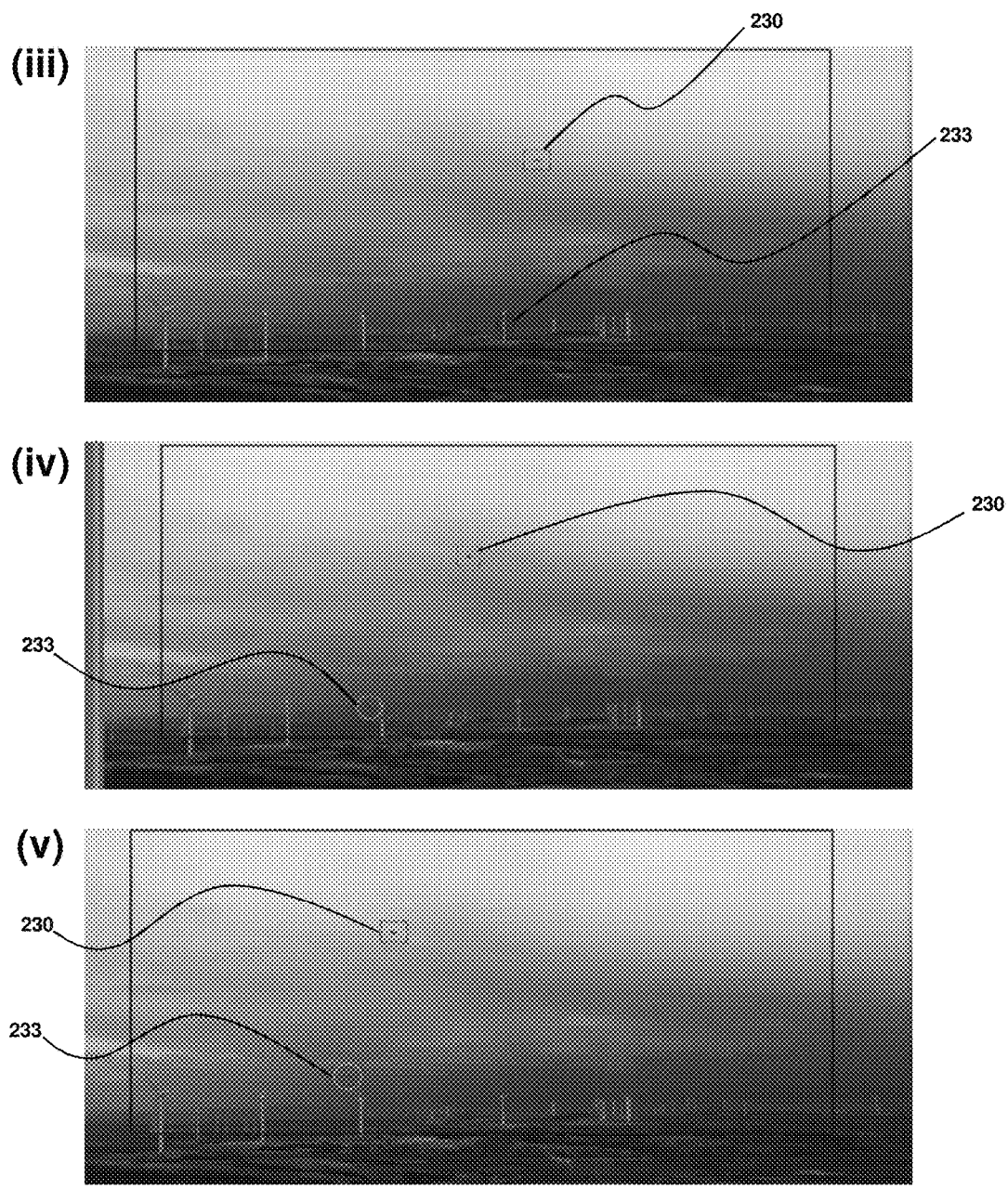

FIG. 18 is an image of a moving object identified as a large raptor. The data associated with this image is: frame number, width and height (as reflected by the box around the raptor), distance, time of detection, and statistical confidence level. FIG. 19 is an image of the raptor at a later time, reflecting the accurate tracking and different glide posture relative to the imager as the raptor changes direction and position. A paired high resolution and WFOV image of a raptor is provided in FIG. 20. The top panel is the high resolution image from a second imager and the bottom panel a WFOV image from the first imager. Successful tracking of a plurality of moving raptors 230 and 233 is illustrated in the images of FIG. 21, panels (i)-(v). Both raptors are located "above" the turbines in panel (i), with raptor 233 decreasing in altitude as reflected in panel (ii). The importance of turbine masking is illustrated in panel (iii), with raptor 233 in at least visual proximity to a wind turbine. The raptor 233 is successfully tracked during flight, including as it increases vertical distance from the ground, as illustrated in panels (iii)-(v).

The test system also facilities collection of images suitable for future classification (post-collection processing and analysis). With the system, 3,890 tracks are recorded, including 148 high-resolution videos of eagles. Of those videos, 26 are within a target stereo range of 300 m to 1 km from the imager, with 92.3% correct classification by wingspan alone. Further improvement is expected with additional avian identification parameters, including color analysis. The system also captured 8 high resolution videos of non-eagle avians.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. Every combination of components or steps described or exemplified herein can be used to practice the invention, unless otherwise stated.

Whenever a range is given in the specification, for example, a volume range, a zoom range, a number range, a distance range, a percentage range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that components, devices, algorithms, and processes other than those specifically exemplified can be employed in the practice of the invention without resort to undue experimentation. All art-known functional equivalents, of any such components, devices, algorithms, and processes are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

TABLE 1

Calibration results for high resolution sensors

| Reference Distance [m] | Average Error [m] | Worst Error [m] | Worst Error [%] |
| --- | --- | --- | --- |
| 677 | 11.54 | −18.55 | −2.7% |
| 894 | 13.88 | 25.80 | 2.9% |
| 1,104 | 20.53 | 41.06 | 3.7% |

We claim:

1. An avian detection system for detecting a flying avian in an airspace comprising:
   a first imager having a wide field of view for detecting a moving object;
   a second imager having a high zoom;
   a positioner operably connected to the second imager for positioning the second imager to image the moving object detected by the first imager;
   a processor operably connected to receive image data from the first imager, the second imager, or both to identify a moving object that is a flying avian based on said image data;
   wherein the avian detection system provides substantially complete hemispherical coverage of said airspace surrounding the avian detection system.

2. The avian detection system of claim 1, comprising a plurality of said first imagers arranged in a spatial configuration to provide substantially complete hemispherical coverage.

3. The avian detection system of claim 1, wherein said first imager comprises a fish-eye lens or detector configured to image visual data from a substantially hemispherical surrounding airspace.

4. The avian detection system of claim 1, wherein the substantially complete hemispherical coverage provides coverage for a volume of airspace having a detection distance from said first imager that is greater than or equal to 0.6 km and less than or equal to 2 km.

5. The avian detection system of claim 4, having a detection efficiency for a selected avian species of interest that is greater than 96%.

6. The avian detection system of claim 5, having a percentage of false positives for said flying avian species of interest that is less than or equal to 5% for said volume of airspace.

7. The avian detection system of claim 5, wherein said avian species of interest comprises a golden eagle or an endangered flying avian species.

8. The avian detection system of claim 1, wherein said processor identifies an output of a subset of pixels of said first imager or said second imager corresponding to said moving object.

9. The avian detection system of claim 8, wherein said subset of pixels comprises neighboring pixels, directly adjacent pixels, or both.

10. The avian detection system of claim 8, wherein said output of said subset of pixels is an array of intensity values.

11. The avian detection system of claim 8, wherein said output of said subset of pixels is a time varying output.

12. The avian detection system of claim 8, wherein said processor analyzes said output of said subset of pixels to determine if said moving object is a said flying avian.

13. The avian detection system of claim 8, wherein said processor analyzes said output to identify the presence of one or more threshold identification attributes.

14. The avian detection system of claim 13, wherein said one or more threshold identification attributes is a boundary parameter.

15. The avian detection system of claim 14, wherein said boundary parameter corresponds to an edge boundary signature characteristic of said flying avian.

16. The avian detection system of claim 15, wherein said edge boundary signature is identified by determining an intensity gradient of said output of said subset of pixels.

17. The avian detection system of claim 16, wherein said edge boundary signature is identified by comparing said intensity gradient to one or more reference values.

18. The avian detection system of claim 15, wherein said edge boundary signature corresponds to an edge straightness parameter.

19. The avian detection system of claim 18, wherein said output is identified as corresponding to an artificial object for said edge straightness parameter indicative of an artificially constructed straight line.

20. The avian detection system of claim 15, wherein said edge boundary signature corresponds to a flying avian.

21. The avian detection system of claim 15, wherein said edge boundary signature corresponds to a threatened or endangered avian species of interest.

22. The avian detection system of claim 13, wherein said one or more threshold identification attributes is a time evolution parameter.

23. The avian detection system of claim 22, wherein said time evolution parameter corresponds to a time evolution signature characteristic of movement of said flying avian.

24. The avian detection system of claim 13, wherein said one or more threshold identification attributes is a color parameter.

25. The avian detection system of claim 24, wherein said color parameter corresponds to a color signature characteristic of said flying avian.

26. The avian detection system of claim 13, wherein upon identification of the presence of said one or more threshold identification attributes, said processor analyzes said output of said subset of pixels to determine one or more avian identification parameters.

27. The avian detection system of claim 26, wherein said processor compares said output of said subset of pixels to one or more reference values in a reference image database to determine if said moving object is a said flying avian.

28. The avian detection system of claim 26, wherein said processor compares said output of said subset of pixels to reference values to determine one or more avian identification parameters selected from the group consisting of size, speed, wing span, wing shape, color, boundary shape, geometry, light intensity, and flight trajectory.

29. The avian detection system of claim 17, wherein said reference values are provided in a reference image database or determined using one or more reference image algorithms.

30. The avian detection system of claim 8, wherein said processor analyzes said output of said subset of pixels via a pattern recognition algorithm.

31. The avian detection system of claim 30, wherein said pattern recognition algorithm identifies said subset of pixels as a species of said flying avian.

32. The avian detection system of claim 31, wherein said avian species comprises a threatened or endangered raptor species.

33. The avian detection system of claim 8, wherein the processor analyzes said output of said subset of pixels from a plurality of frames of said image data, wherein said subset of pixels spatially moves with time and said movement with time is used to determine a trajectory of said output of said subset of pixels.

34. The avian detection system of claim 33, wherein said trajectory comprises positions, distances, velocities, directions or any combination thereof at a plurality of times.

35. The avian detection system of claim 34, further comprising determining a predictive trajectory corresponding to a future time interval.

36. The avian detection system of claim 30, wherein said pattern recognition algorithm comprises a database of physical parameters associated with a flying avian species of interest, and the processor compares a physical parameter determined from said first imager or said second imager to a corresponding physical parameter from said database of physical parameters to filter out moving objects that are not a flying avian or are not a flying avian species of interest.

37. The avian detection system of claim 36, wherein said flying avian of interest is an endangered raptor species or a golden eagle.

38. The avian detection system of claim 1, wherein said processor filters moving objects that do not correspond to an avian species of interest.

39. The avian detection system of claim 1, wherein said first imager has a horizontal and vertical field of view that is selected from a range that is greater than or equal to 60° and less than or equal to 120° and/or a resolution that is selected from a range that is greater than or equal to 8" per pixel and less than or equal to 14" per pixel.

40. The avian detection system of claim 1, wherein said second imager has a resolution that is selected from a range that is greater than or equal to 1 cm per pixel and less than or equal to 4 cm per pixel and/or said high zoom is selected from a range that is greater than or equal to 10× and less than or equal to 1000×.

41. The avian detection system of claim 1, wherein a plurality of first imagers are arranged in distinct alignment directions to provide full 360° hemispherical coverage by the plurality of first imagers fields of view up to and including a vertical alignment direction.

42. The avian detection system of claim 41, wherein a moving object is continuously identified for object movement from a first imager field of view to a spatially adjacent second imager field of view.

43. The avian detection system of claim 1, wherein said first imager, said second imager, or both said first and the second imagers detect a wavelength range corresponding to light in the visible or infra-red spectrum.

44. The avian detection system of claim 43, wherein the wavelength range is in the infra-red for identification in low-light or adverse weather conditions.

45. The avian detection system of claim 1, configured to simultaneously identify a plurality of moving objects.

46. The avian detection system of claim 1 used to decrease incidence of avian kills by a wind turbine.

47. The avian detection system of claim 46, wherein said avian is a raptor.

48. The avian detection system of claim 47, wherein said raptor is a golden eagle.

49. The avian detection system of claim 46, comprising a plurality of said first imagers arranged in a spatial configuration to provide the substantially complete hemispherical coverage, wherein one of said first imagers is oriented in an upward direction to cover a region of airspace above the wind turbine.

50. The avian detection system of claim 1, further comprising a controller operably connected to the processor to provide an action implementation.

51. The avian detection system of claim 50, wherein the action implementation is selected from the group consisting of an alarm, an alert to an operator, a count, an active avoidance measure, or a decrease or stop to a wind turbine blade speed when the avian detection system identifies a flying avian that is a threatened or an endangered species having a predicted trajectory in a wind turbine surrounding airspace that will otherwise likely result in wind turbine blade impact.

52. The avian detection system of claim 1, for counting a number of flying avians within said airspace surrounding said avian detection system over a time period.

53. The avian detection system of claim 1 that is stationary.

54. The avian detection system of claim 1 that is mounted to a moving vehicle.

55. The avian detection system of claim 1, wherein said positioner comprises a motorized pan and tilt head connected to said second imager for moving an alignment direction of said second imager based on an output from said first imager.

56. The avian detection system of claim 1, wherein said first imager, said second imager, or both said first and second imagers are cameras.

57. An avian detection system for detecting a flying avian in an airspace comprising:
a first imager having a wide field of view for detecting a moving object;
a stereo imager comprising a pair of second imagers each independently having a high zoom;
a positioner operably connected to the stereo imager for positioning said stereo imager to image said moving object detected by the first imager; and
a processor operably connected to receive image data from said first imager, said stereo imager, or both and to determine a position and trajectory of said moving object, thereby identifying a moving object that is a flying avian based on image data from the first imager, the second imager, or both the first and second imager.

58. The avian detection system of claim 57, providing substantially complete hemispherical coverage of an airspace surrounding the avian detection system.

59. The avian detection system of claim 57, further comprising a plurality of first imagers, a plurality of stereo imagers, or a plurality of first imagers and a plurality of stereo imagers, wherein each of the said imagers are aligned in distinct alignment directions to provide substantially complete hemispherical coverage of airspace surrounding said avian detection system.

60. The avian detection system of claim 57, wherein said processor is wirelessly connected to the imagers.

61. The avian detection system of claim 57, wherein said processor is hard wired to obtain image data output from the first imager, the second imager, or the stereo imager.

62. The avian detection system of claim 57, further comprising:
a plurality of wide field of view systems, wherein said plurality of wide field of view systems in combination provides 360° imaging coverage around said avian detection system.

63. The avian detection system of claim 62, further comprising:
a tower interface for connecting each of the wide field of view systems and the stereo imager system to a tower.

64. The avian detection system of claim 63, further comprising a substrate having a top surface and a bottom surface, wherein said positioner connects said stereo imager system to said substrate top surface and said wide field of view system is connected to said substrate bottom surface.

65. The avian detection system of claim 63, wherein said tower interface further comprises:
a central interface portion for supporting said stereo imager system and connecting to a top portion of a tower; and
outer support struts for supporting the wide field of view systems.

66. A method of detecting a flying avian in an airspace, the method comprising the steps of:
imaging the airspace surrounding an imaging system;
obtaining one or more threshold identification attributes for an output of a subset of pixels from the imaging step;
analyzing the one or more threshold identification attributes to identify a moving object of interest;
obtaining one or more avian identification parameters for the moving object of interest;
comparing the one or more avian identification parameters to a corresponding one or more reference avian identification parameters to identify the moving object of interest as an avian of interest; and
implementing an action implementation for the avian of interest;
wherein the method detects the flying avian of interest within the airspace having a volume equivalent to an average-equivalent hemisphere with an average radius selected from a range that is greater than or equal to 0.5 km and less than or equal to 1.2 km.

67. The method of claim 66, wherein the imaging step comprises identifying an output of a subset of pixels that is an array of light intensity values.

68. The method of claim 66, wherein the imaging comprises obtaining a wide field of view with a first imager and optically zooming in on the moving object of interest with a second imager, wherein the second imager is used to determine a distance of the moving object of interest from the imaging system.

69. The method of claim 66, for detecting an avian species that is a raptor.

70. The method of claim 66, wherein the imaging step further comprises obtaining a plurality of images at different times and determining a trajectory of the output of the subset of pixels.

71. The method of claim 68, wherein the distance is determined using a stereo imager that is positioned to image the moving object.

72. The method of claim 69, wherein the analyzing step is via a pattern recognition algorithm.

73. The method of claim 66, wherein the one or more threshold identification attributes is selected from the group consisting of distance, trajectory, boundary parameter, boundary shape, edge boundary characteristic, pixel spacing, pixel intensity, pixel color, intensity gradient, time evolution parameter, and any combination thereof.

74. The method of claim 73, wherein the one or more threshold identification attributes is a boundary parameter.

75. The method of claim 74, further comprising the step of comparing the boundary parameter to an edge boundary signature characteristic of a flying avian.

76. The method of claim 74, further comprising the step of identifying a moving object as corresponding to an artificially-constructed object by identifying at least a portion of the boundary parameter as having a shape indicative of an artificially-constructed object.

77. The method of claim 76, wherein the boundary parameter comprises an edge straightness parameter indicative of the artificially constructed object.

78. The method of claim 66, wherein the one or more avian identification parameters is selected from the group consisting of size, speed, wing span, avian posture or ratio of wing span width to height or vice versa (w/h or h/w), wing shape, color, boundary shape, geometry, light intensity, flight trajectory, and a temperature or a heat signature.

79. The method of claim 66, wherein the avian species of interest is a threatened species, an endangered species, or a migratory bird.

80. The method of claim 79, wherein the threatened or endangered species is a raptor.

81. The method of claim 66, wherein the comparing step comprises a pattern recognition algorithm.

82. The method of claim 66, having a detection sensitivity that is greater than 96% and a false positive detection that is less than 5% for a threatened species, endangered species, or a species of interest for the airspace corresponding to a maximum distance from the imaging system that is greater than 0.6 km and less than 1.2 km.

83. The method of claim 66, further comprising the step of obtaining a predictive trajectory of the flying avian.

84. The method of claim 83, used with a wind turbine, the method further comprising the steps of:
decreasing a blade wind turbine speed or stopping movement of the blade turbine to minimize or avoid risk of blade strike by the avian having the predictive trajectory that would otherwise likely result in blade strike of the avian.

85. The method of claim 84, wherein the avian is a species that is a threatened or endangered species.

86. The method of claim 85, wherein the threatened or endangered species is defined under the Endangered Species Act of U.S. law.

87. The method of claim 84, wherein the avian is a golden eagle.

88. The method of claim 84, wherein the blade wind turbine speed is not decreased for an avian species that is identified as not an avian species of interest, thereby maximizing wind turbine efficiency.

89. The method of claim 66, wherein the implementing an action step comprises one or more of: providing an alert to a person; emitting an alarm; triggering a count event; triggering a deterrent to encourage movement of the flying avian out of the airspace surrounding the first imager; recording an image or video of the avian flying through the airspace surrounding the first imager; or decreasing or stopping a wind turbine blade speed.

90. The method of claim 89, further comprising the step of defining an action implementation airspace having an average action distance that is less than the average-equivalent radius of the substantially hemispherical airspace surrounding the imaging system, wherein the action implementation is implemented for a flying avian that is:
- within the substantially hemispherical airspace and having a trajectory toward the action implementation airspace; or
- within the action implementation airspace.

91. The method of claim 84, further comprising the step of turbine masking for an image of a flying avian in an optical region containing a moving turbine blade, thereby improving detection.

92. The avian detection system of claim 1, wherein the second imager comprises a stereo imager comprising a pair of second imagers each independently having a high zoom.

93. The avian detection system of claim 1, wherein the second imager comprises a stereo imager comprising a pair of second imagers each independently having a high zoom, said avian detection system further comprising:
- at least three wide field of view systems, each providing a field of view between 120° and 140°;
- a ground enclosure containing ancillary equipment electrically connected to said imagers by cables that run through an inner passage within the tower; and
- a lightning mitigation system extending from the tower top, wherein the imagers are positioned so as to image airspace around the tower without optical obstruction by the lightning mitigation system.

94. The avian detection system of claim 57, comprising:
- at least three wide field of view systems, each providing a field of view between 120° and 140°;
- a ground enclosure containing ancillary equipment electrically connected to said imagers by cables that run through an inner passage within the tower; and
- a lightning mitigation system extending from the tower top, wherein the imagers are positioned so as to image airspace around the tower without optical obstruction by the lightning mitigation system.

* * * * *